US008833713B2

(12) United States Patent
Kitaguchi

(10) Patent No.: US 8,833,713 B2
(45) Date of Patent: Sep. 16, 2014

(54) WALL-MOUNTED ATTACHING APPARATUS

(75) Inventor: Akihiro Kitaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 185 days.

(21) Appl. No.: 12/884,975

(22) Filed: Sep. 17, 2010

(65) Prior Publication Data
US 2011/0101185 A1 May 5, 2011

(30) Foreign Application Priority Data

Sep. 30, 2009 (JP) .............................. JP2009-226161

(51) Int. Cl.
A47B 96/00 (2006.01)
A47K 1/00 (2006.01)
A47K 5/00 (2006.01)
E04G 5/06 (2006.01)
F16L 3/08 (2006.01)

(52) U.S. Cl.
USPC .................... 248/224.8; 248/220.21; 248/317; 248/918

(58) Field of Classification Search
USPC ............ 248/222.13, 220.21, 276.1, 917–923, 248/231.9, 221.11, 224.8; 361/679.02, 361/679.04
See application file for complete search history.

(56) References Cited

U.S. PATENT DOCUMENTS

| 6,198,222 | B1 * | 3/2001 | Chang ............................ 313/582 |
| 6,480,243 | B2 * | 11/2002 | Yamamoto .................... 348/836 |
| 6,802,575 | B1 * | 10/2004 | Lee ................................. 312/7.2 |
| 7,663,706 | B2 * | 2/2010 | Ryu ............................... 348/836 |
| 8,313,072 | B2 * | 11/2012 | Bakkom et al. .......... 248/289.11 |
| 2006/0244870 | A1 | 11/2006 | Yamato et al. |
| 2007/0000849 | A1 | 1/2007 | Lutz et al. |
| 2007/0057133 | A1 | 3/2007 | Cottingham |
| 2009/0065667 | A1 | 3/2009 | Bakkom et al. |
| 2009/0184221 | A1 * | 7/2009 | Sculler ..................... 248/221.11 |
| 2009/0278007 | A1 * | 11/2009 | Taylor ...................... 248/222.13 |
| 2010/0171013 | A1 * | 7/2010 | Anderson et al. ............. 248/201 |

FOREIGN PATENT DOCUMENTS

| CN | 201000768 Y | 1/2008 |
| CN | 201146568 Y | 11/2008 |
| JP | 04-320095 A | 11/1992 |
| JP | 2002-354377 A | 12/2002 |
| JP | 2006-53212 A | 2/2006 |
| JP | 2006-308902 A | 11/2006 |
| JP | 2008-141606 | 6/2008 |
| WO | WO 2008/054720 A2 | 5/2008 |
| WO | WO 2008/054720 A3 | 5/2008 |
| WO | WO 2008/054720 A9 | 5/2008 |

OTHER PUBLICATIONS

Peerless Mounts; Video Wall Pull-out Mount—Technical Data Sheet-Models: VWP-4050-B, VWP-4050S; Issued on Mar. 20, 2008; pp. 1-3.

* cited by examiner

Primary Examiner — Amy J Sterling
(74) Attorney, Agent, or Firm — Birch, Stewart, Kolasch & Birch LLP

(57) ABSTRACT

A mount portion has a rectangular outside shape, and has an opening in its center part that can be fitted by hanging on mounting brackets fixed on a wall surface. An installation surface has mount fixing holes in its upper part and mount fixing holes in its lower part. Default positioning holes are provided adjacent to the mount fixing holes. In screwing, the mount fixing holes have given screwing position freedom. The regions of the default positioning holes have smaller opening areas than the regions of the mount fixing holes.

13 Claims, 20 Drawing Sheets

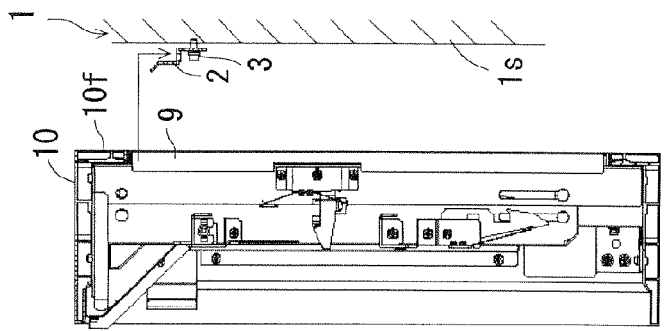
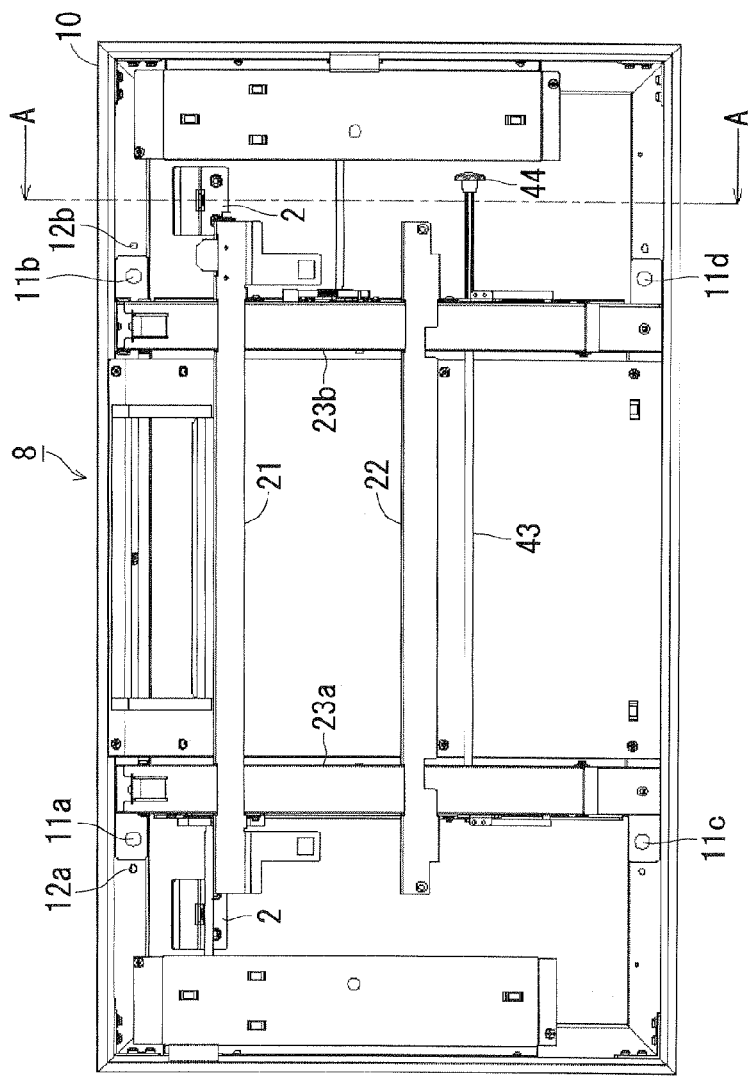
FIG. 1A
FIG. 1B

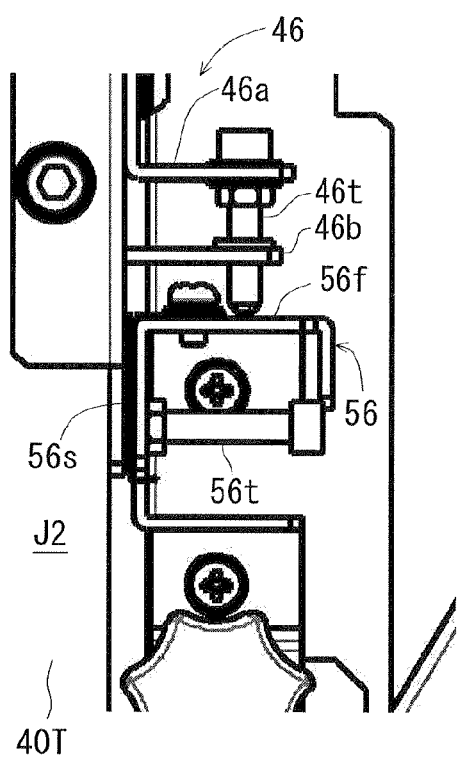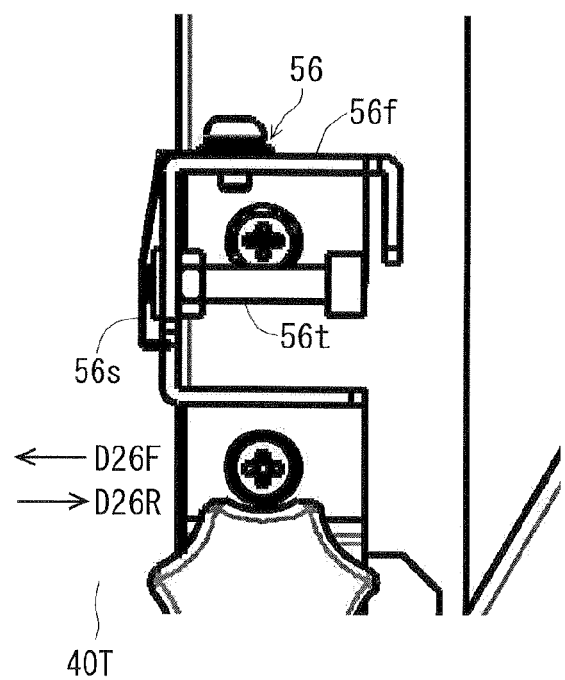

WALL-MOUNTED ATTACHING APPARATUS

BACKGROUND OF THE INVENTION

1. Field of the Invention

The present invention relates to a wall-mounted attaching apparatus for use with a display apparatus such as a thin display.

2. Description of the Background Art

Usually, when installing a display apparatus, such as a thin display, on a wall surface, a wall-mounted attaching apparatus for attaching the display apparatus is previously fixed on the wall surface, and then the display apparatus is attached to the wall-mounted attaching apparatus.

Such wall-mounted attaching apparatuses include the thin display wall mounting apparatus disclosed in Japanese Patent Application Laid-Open No. 2006-53212 (FIG. 6), for example.

This wall-mounting apparatus has a base plate fixed on a wall surface and an attaching frame previously attached to the back of a thin display. Engaging pins provided in upper and lower portions of the back of the attaching frame are detachably joined to supporting beams provided on the front side of the base plate. The lower engaging pins inserted in insert holes of the supporting beams are automatically locked by engaging portions, and releasing members that draw down the engaging portions release the locked state of the engaging portions.

Conventional wall-mounted attaching apparatuses are structured as above, and the work of fixing the wall-mounted attaching apparatus itself on the wall surface relatively take time and effort, and it is difficult to fix the wall-mounted attaching apparatus itself on the wall surface correctly according to the original design.

SUMMARY OF THE INVENTION

An object is to obtain a wall-mounted attaching apparatus that facilitates the work of fixing the wall-mounted attaching apparatus itself on a wall surface and that enables the wall-mounted attaching apparatus itself to be fixed on the wall surface correctly according to the original design.

The wall-mounted attaching apparatus of the present invention is a wall-mounted attaching apparatus for attaching a given display apparatus on a wall surface, and it has a frame body having an installation surface that is opposed to the wall surface.

The installation surface of the frame body includes a hung opening, a plurality of fixing screw holes, and a plurality of positioning holes.

The hung opening can be hung with a given mounting hardware provided on the wall surface. The plurality of fixing screw holes are provided to fix the frame body by screwing on the wall surface, and the plurality of fixing screw holes have given screwing position freedom.

According to the wall-mounted attaching apparatus of the present invention, a plurality of wall-mounted attaching apparatuses for installing given display apparatuses in a multiple arrangement manner can be easily and correctly attached.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1A and 1B are illustrative diagrams illustrating the structure of a wall-mounted attaching apparatus according to a preferred embodiment of the present invention;

FIGS. 26A and 26B are illustrative diagrams showing the lower placing portion of the thin display apparatus supported on the lower placing stand of the wall-mounted attaching apparatus.

DESCRIPTION OF THE PREFERRED EMBODIMENTS

<Installation on Wall Surface>

Figure 2:
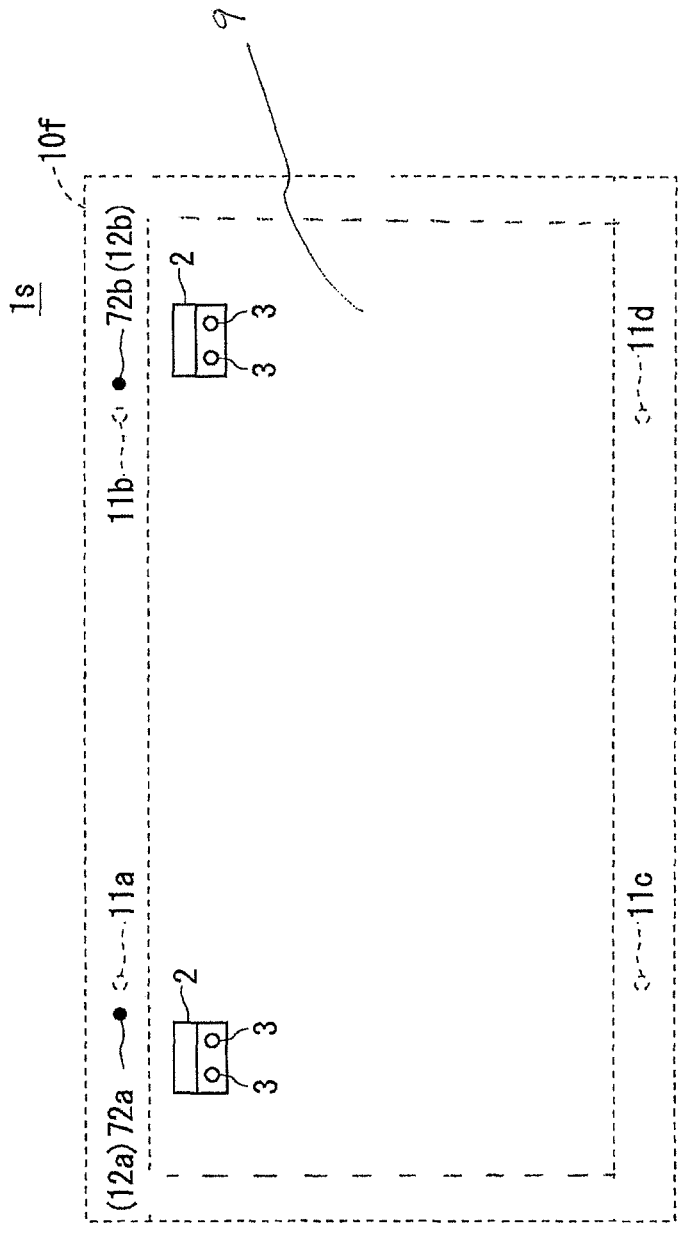
FIG. 2 is an illustrative diagram schematically showing the wall surface to which the wall-mounted attaching apparatus of the preferred embodiment is attached.

FIGS. 1A and 1B are illustrative diagrams showing the structure of a wall-mounted attaching apparatus according to a preferred embodiment of the present invention. FIG. 1A shows the top view (the structure seen from the side where a thin display is installed), and FIG. 1B shows the A-A section of FIG. 1A.

As shown in FIG. 1A, the wall-mounted attaching apparatus 8 includes a display apparatus attaching portion including horizontal front bars 21 and 22, vertical front bars 23a and 23b, a shaft 43, a knob 44, etc. provided in a mount portion 10 as a frame body, and an exhaust portion (not shown in FIGS. 1A and 1B). Illustrative diagrams of the display apparatus attaching portion and the exhaust portion will be described later in detail.

The outside shape of the mount portion 10 is rectangular, and its installation surface has mount fixing holes 11a and 11b in an upper part, and mount fixing holes 11c and 11d in a lower part. Also, default positioning holes 12a and 12b are formed adjacent to the mount fixing holes 11a and 11b.

The mount fixing holes 11a to 11d each have ϕ15 (a diameter of 15 mm), and they are provided to fix the mount portion 10 on the surface 1s of the wall 1 with screws of about M6 (diameter is 6 mm) through washers exceeding ϕ15. Accordingly, when screwed with screws of about M6, the mount fixing holes 11a to 11d have given screwing position freedom.

On the other hand, the default positioning holes 12a and 12b have a size of about ϕ6. That is, the regions of the default positioning holes 12a and 12b have smaller opening areas than the regions of the mount fixing holes 11a to 11d. The default positioning holes 12a and 12b are sized sufficient for positioning, and their opening areas may be the same as or larger than the opening areas of the mount fixing holes.

FIG. 2 is an illustrative diagram schematically showing the wall surface to which the wall-mounted attaching apparatus 8 of the preferred embodiment is attached. As shown in FIG. 2, positioning marks 72a and 72b are previously provided on the wall surface is for the positioning with the default positioning holes 12a and 12b. Also, as shown in FIG. 1B and FIG. 2, mounting brackets (mounting hardwares) 2, 2 are screwed on the wall surface 1s with screws 3 in given positions based on the positioning marks 72a and 72b.

Also, as described above, the installation surface 10f of the mount portion 10 shown by broken line in FIG. 2 has the mount fixing holes 11a to 11d and the default positioning holes 12a and 12b, and there is an opening 9 (a wall-hung opening), as a central, relatively large area, that can be hung with the mounting brackets 2, 2.

The wall-mounted attaching apparatus 8 of the preferred embodiment thus structured can be fixed on the wall surface 1s through the following steps (a) to (d).

(a) The positioning marks 72a and 72b are provided in given positions on the wall surface 1s, and the mounting brackets 2, 2 are mounted on the basis of the positioning marks 72a and 72b.

(b) The upper end of the opening 9 of the mount portion 10 is hung on the mounting brackets 2, 2, so as to temporarily place the wall-mounted attaching apparatus 8 on the wall surface 1s. In this temporarily placed state, the positions of the default positioning holes 12a and 12b are lower than the positioning marks 72a and 72b.

(c) The mount portion 10 is slightly raised such that the default positioning holes 12a and 12b coincide with the positioning marks 72a and 72b on the wall surface 1s.

(d) In the positioned state in the step (c), screws are tightened through the mount fixing holes 11a to 11d to fix the installation surface of the mount portion 10 on the wall surface 1s.

By performing the steps (a) and (b), the wall-mounted attaching apparatus 8 can be temporarily placed on the wall surface 1s relatively easily. Also, since the wall-mounted attaching apparatus 8 is thus temporarily placed in step (b), the attaching work of and after step (c) can be performed while certainly preventing the wall-mounted attaching apparatus 8 from falling down until step (d) ends.

Also, in step (d), because the mount fixing holes 11a to 11d have given screwing position freedom, the installation surface 10f can be easily and accurately attached such that the default positioning holes 12a and 12b coincide with the positioning marks 72a and 72b even when the installation surface 10f of the mount portion 10 has some dimension errors.

By sequentially applying steps (a) to (d) to the attachment of other wall-mounted attaching apparatuses 8, a plurality of wall-mounted attaching apparatuses 8 can be easily arranged on the wall surface 1s correctly according to the original design, in order to install thin displays in a multiple arrangement manner. Also, when a plurality of wall-mounted attaching apparatuses 8 are sequentially arranged from the bottom row to the top row, the step (c) can be omitted in the attachment work except for the bottom row. This shortens the time required to attach the wall-mounted attaching apparatuses 8.

<Exhaust Structure>

Figure 3:
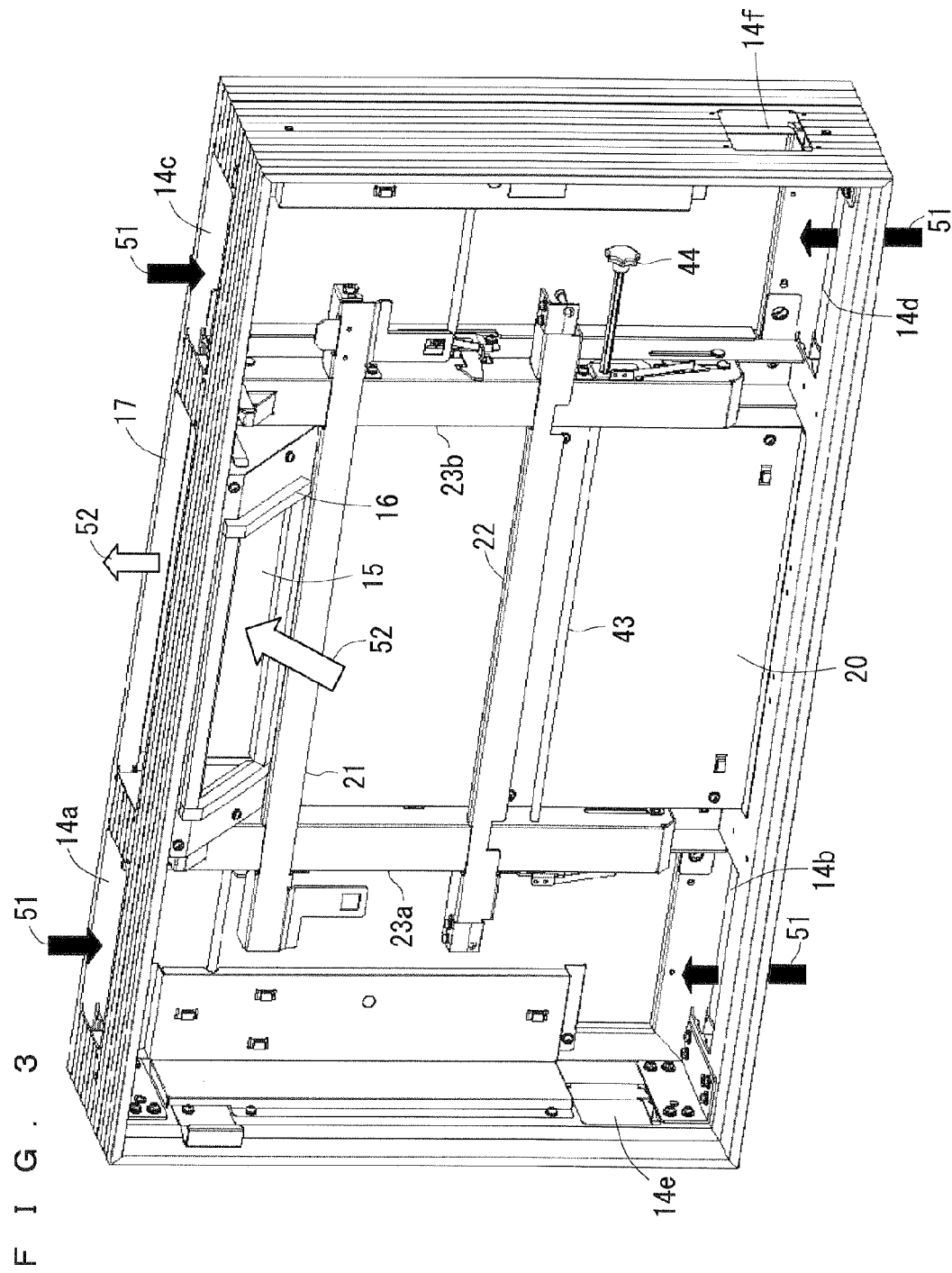
FIG. 3 is a perspective view illustrating an exhaust structure of the wall-mounted attaching apparatus of the preferred embodiment.
Figure 4:
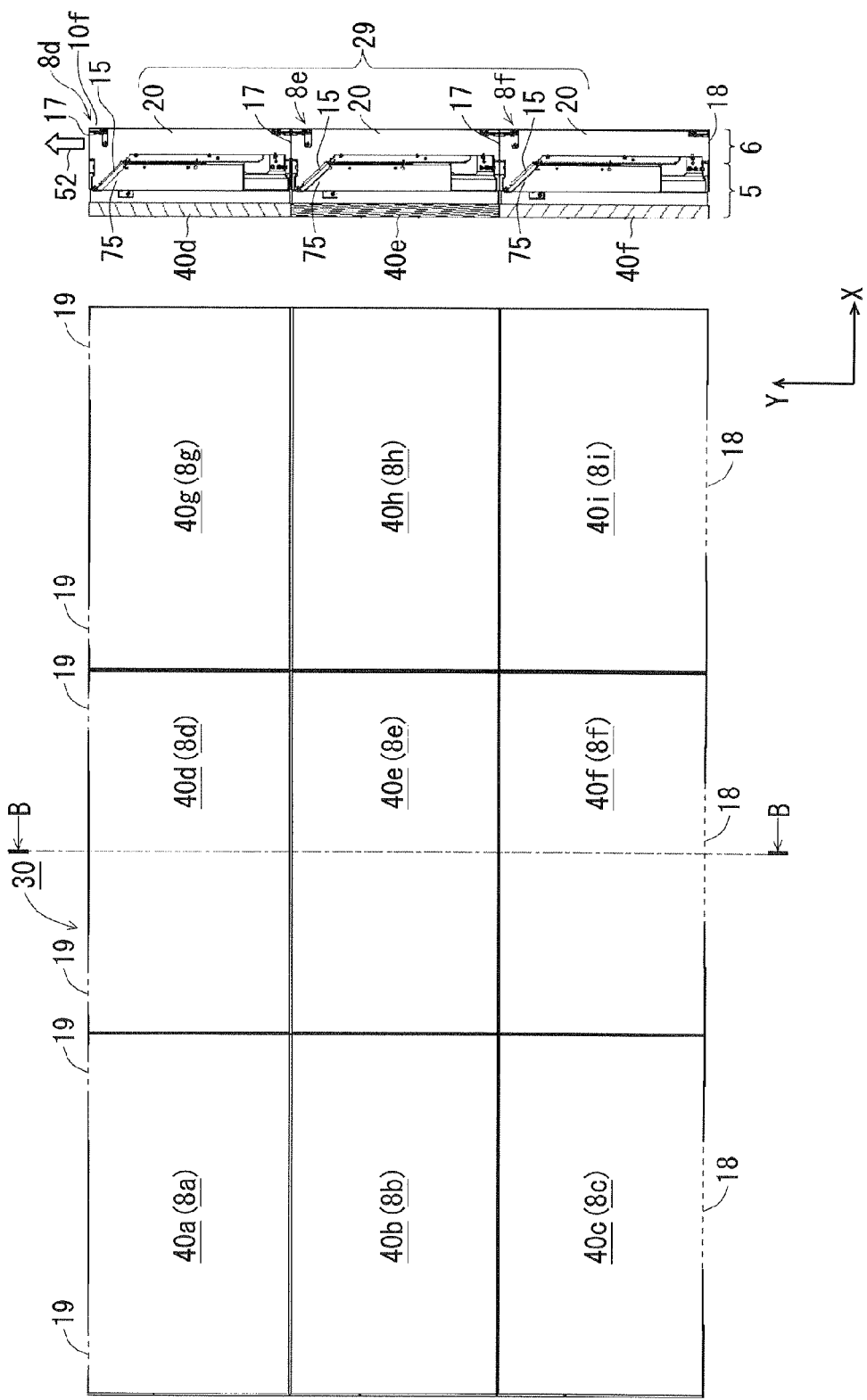
FIGS. 4A and 4B are illustrative diagrams showing nine thin display apparatuses arranged in a 3×3 multiple arrangement manner.

FIG. 3 is a perspective view illustrating the exhaust structure of the wall-mounted attaching apparatus 8 of this preferred embodiment. FIGS. 4A and 4B are illustrative diagrams showing nine thin display apparatuses 40a to 40i installed in a 3×3 multiple arrangement manner by using nine wall-mounted attaching apparatuses 8a to 8i. FIG. 4A shows the front view and FIG. 4B shows the B-B section of FIG. 4A.

As shown in these diagrams, the exhaust portion 6 is provided on the side of the installation surface 10f of the mount portion 10, in order to exhaust the air that cooled the thin display apparatus 40 attached to the display apparatus attaching portion 5, and a chimney 20 is provided from the top to bottom in the central region. At the top of the chimney 20, a near-display exhaust hole 15 is provided, and it inclines in a direction separated away from the installation surface 10f of the mount portion 10. When thin display apparatuses 40 (the thin display apparatuses 40d, 40e, 40f in FIG. 4B) are attached to the display apparatus attaching portions 5, the near-display exhaust holes 15 are positioned near their exhaust holes 75. Also, an exhaust hole frame 16 made of buffer material is provided around the near-display exhaust hole 15, so that intimate contact is provided between the exhaust hole frame 16 and the exhaust hole 75 of the thin display apparatus 40 when the thin display apparatus 40 is accommodated in the display apparatus attaching portion 5 of the wall-mounted attaching apparatus 8. The display apparatus attaching portion 5 includes pantograph structures 26, horizontal front bars 21, 22, upper attaching members 45, 55, a lower placing portion 46, a lower placing stand 56 etc. that will be fully described later, and it is a collective name of the portions that contribute to the attachment of the thin display apparatus 40.

Also, the upper surface and the lower surface of the mount portion 10 have external exhaust holes 17 for the chimney 20, the upper surface and the lower surface of the mount portion 10 have left intake holes 14a and 14b on one side of the external exhaust holes 17 (on the left side in FIG. 3), and the upper surface and the lower surface of the mount portion 10 have right intake holes 14e and 14d on the other side of the external exhaust holes 17 (on the right side in FIG. 3).

Also, side intake holes 14e and 14f are provided in lower parts of both sides of the mount portion 10. Also, intake flows 51 which are taken from the left intake holes 14a and 14b and the right intake holes 14c and 14d and exhaust flows 52 which are exhausted from the external exhaust holes 17 are shown in FIG. 3.

In this way, the exhaust portion 6 of the wall-mounted attaching apparatus 8 includes the chimney 20, near-display exhaust hole 15, exhaust hole frame 16, external exhaust holes 17, and intake holes 14a to 14f, etc, and the heat generated from the thin display apparatus 40 attached to the display apparatus attaching portion 5 is exhausted from the external exhaust hole 17 in the upper surface from the exhaust hole 75 through the chimney 20. As air is exhausted in this way, air is taken in from the intake holes 14a to 14f.

In this way, the wail-mounted attaching apparatus 8 of this preferred embodiment has the heat-exhausting exhaust portion 6 for exhausting air that cooled the thin display attached in the mount portion 10. Thus, even when the thin display has no particular exhaust portion for exhausting heat, air is certainly exhausted through the exhaust portion 6 of the wall-mounted attaching apparatus 8, and the temperature rise in the thin display can be effectively suppressed.

Next, as shown in FIGS. 4A and 4B, the exhaust operation effected when thin display apparatuses 40a to 40i are installed in a 3×3 multiple arrangement manner will be described, where the thin display apparatuses 40a to 40i are attached to the wall-mounted attaching apparatuses 8a to 8i. In the description below, the horizontal direction in FIGS. 4A and 4B is described as X direction and the vertical direction is described as direction. That is to say, the direction in which the upper surface and the lower surface of the mount portion 10 are formed is defined as X direction, and the direction in which its both sides are formed is defined as Y direction.

The external exhaust holes 17 are formed in the upper surface and the lower surface. When a plurality of wall-mounted attaching apparatuses 8 are arranged along direction, the external exhaust holes 17 in the lower surface and the upper surface of wall-mounted attaching apparatuses 8 arranged along Y direction coincide with each other, and the chimneys 20 are connected between the plurality of wall-mounted attaching apparatuses 8 thus arranged.

In the same way, the intake holes 14a and 14c, and 14b and 14d, are provided in the upper surface and the lower surface. When a plurality of wall-mounted attaching apparatuses 8 are arranged along Y direction, the left intake holes 14a and 14b and the right intake holes 14c and 14d coincide with each other between the plurality of wall-mounted attaching apparatuses 8 arranged along Y direction.

In addition, the side intake holes 14e and 14f are provided on both sides. When a plurality of wall-mounted attaching apparatuses 8 are arranged along X direction, the side intake holes 14e and 14f coincide with each other between the plurality of wall-mounted attaching apparatuses 8 arranged in X direction.

Accordingly, as shown in FIG. 4B, between the wall-mounted attaching apparatus 8d and the wall-mounted attaching apparatus 8e, for example, the external exhaust hole 17 in the upper surface of the lower wall-mounted attaching apparatus 8e and the external exhaust hole 17 in the lower surface of the upper wall-mounted attaching apparatus 8d coincide with each other. As a result, the chimneys 20 are connected between the plurality of wall-mounted attaching apparatuses 8 arranged in Y direction, and an exhaust passage 29 is formed for the three wall-mounted attaching apparatuses 8.

As shown in FIGS. 4A and 4B, covers 18 are provided over the external exhaust holes 17 in the lower surfaces of the lowermost wall-mounted attaching apparatuses 8 (the wall-mounted attaching apparatuses 8c, 8f, 8i), such that air from the near-display exhaust holes 15 is likely to flow into the exhaust passage 29, and the heat generated from the three thin display apparatuses 40 arranged in Y direction can be exhausted from the external exhaust holes 17 in the upper surfaces of the uppermost wall-mounted attaching apparatuses 8 (the wall-mounted attaching apparatuses 8a, 8d, 8g.

Similarly, between the wall-mounted attaching apparatus 8d and the wall-mounted attaching apparatus 8e, for example, the intake holes 14a and 14c in the upper surface of the lower wall-mounted attaching apparatus 8e and the intake holes 14b and 14d in the lower surface of the upper wall-mounted attaching apparatus 8d coincide with each other. As a result, the intake holes 14a to 14d are connected between the plurality of wall-mounted attaching apparatuses 8 arranged in Y direction and an intake passage is formed for the three wall-mounted attaching apparatuses 8.

As shown in FIGS. 4A and 4B, covers 19 are provided over the intake holes 14a and the intake holes 14c in the upper surfaces of the uppermost wall-mounted attaching apparatuses 8 (the wall-mounted attaching apparatuses 8a, 8d, 8g), such that relatively cool outside air is likely to enter the inside of the wall-mounted attaching apparatuses 8, and relatively cool outside air is taken in from the intake holes 14b and 14d in the lower surfaces of the lowermost wall-mounted attaching apparatuses 8 (the wall-mounted attaching apparatuses 8c, 8f, 8i), which enhances the cooling effect by the exhaust operation from the three thin display apparatuses 40 arranged in Y direction in a multiple arrangement manner.

Also, for example, between the wall-mounted attaching apparatus 8d and the wall mounted attaching apparatus 8g, the right intake hole 14f in the right side of the left wall-mounted attaching apparatus 8d and the left intake hole 14e in the left side of the right wall-mounted attaching apparatus 8g coincide with each other. As a result, the side intake holes 14e and 14f are connected between the plurality of wall-mounted attaching apparatuses 8 arranged in X direction, and an intake passage is formed for the three wall-mounted attaching apparatuses 8, which enhances the cooling effect by the exhaust operation.

In this way, when a plurality of wall-mounted attaching apparatuses 8 are arranged along Y direction, the chimneys 20 and the external exhaust holes 17 as exhaust passages of individual wall-mounted attaching apparatuses 8 are continuously connected between the plurality of wall-mounted attaching apparatuses 8 arranged along Y direction, and they form the exhaust passages 29. Thus, an effective exhaust operation is possible even when multiple thin displays are arranged along Y direction, and the temperature rise in the multiple thin displays can be effectively suppressed.

Also, as to the plurality of intake holes 14a to 14f provided in the mount portion 10, when a plurality of wall-mounted attaching apparatuses 8 are arranged along X direction and Y direction, the sets of the left intake holes 14a and 14b, the sets of the right intake holes 14c and 14d, and the sets of the side intake holes 14e and 14f coincide in X direction and Y direction, and an intake operation is smoothly effected with the exhaust operation described above.

In addition, when given display apparatuses are arranged in a multiple arrangement manner in X direction and Y direction, cables between the multiple thin displays can be relatively easily routed through the plurality of intake holes 14a to 14f.

<Operation of Movable Portion of Display Apparatus Attaching Portion>

Figure 5:
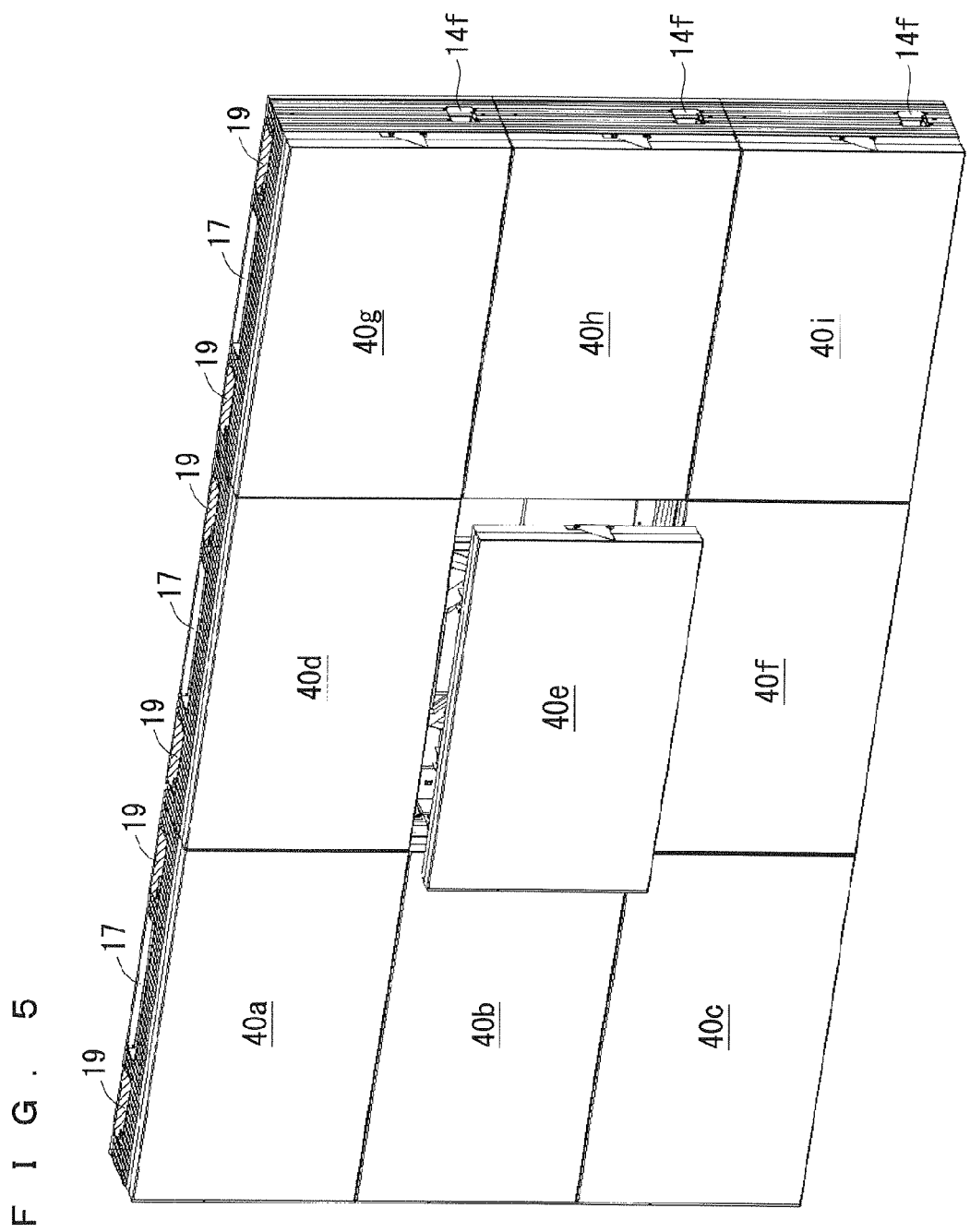
FIG. 5 is a perspective view illustrating nine thin display apparatuses arranged in a 3×3 multiple arrangement manner.

FIG. 5 is a perspective view illustrating nine thin display apparatuses 40a to 40i installed in a 3×3 multiple arrangement manner. In the 3×3 multiple arrangement, it is possible to relatively easily attach and detach the central thin display apparatus 40e alone, because the wall-mounted attaching apparatus 8 has two pantograph structures 26a and 26b as a movable portion that moves frontward and rearward, which will be described below.

Figure 6:
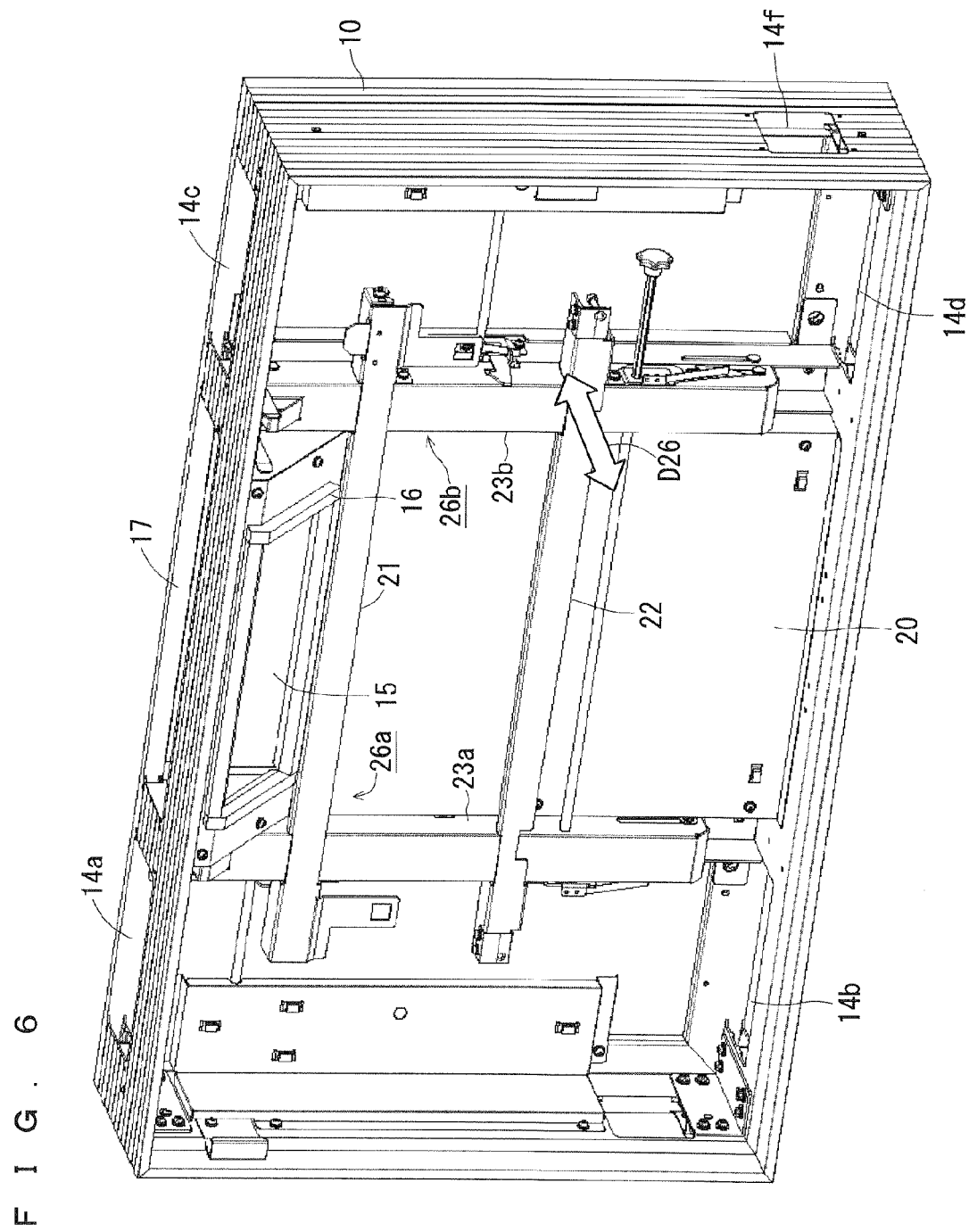
FIG. 6 is a perspective view illustrating the wall-mounted attaching apparatus of the preferred embodiment with its pantograph structure moved rearward.
Figure 7:
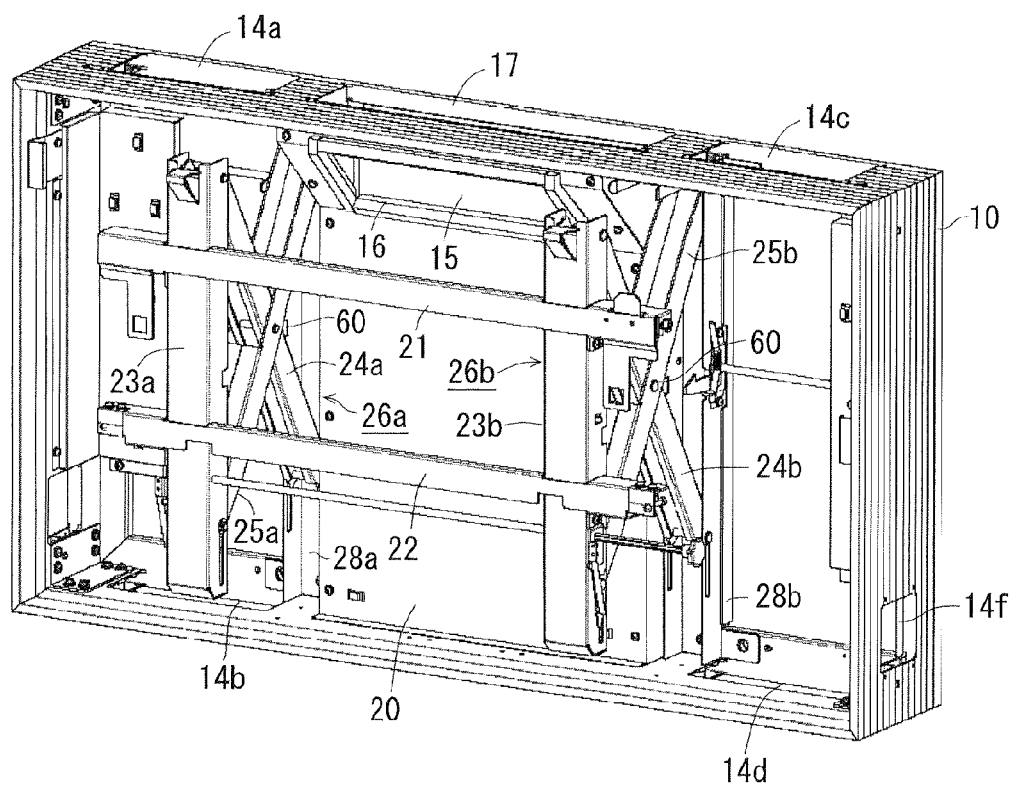
FIG. 7 is a perspective view illustrating the wall-mounted attaching apparatus of the preferred embodiment with its pantograph structure moved frontward.
Figure 8A:
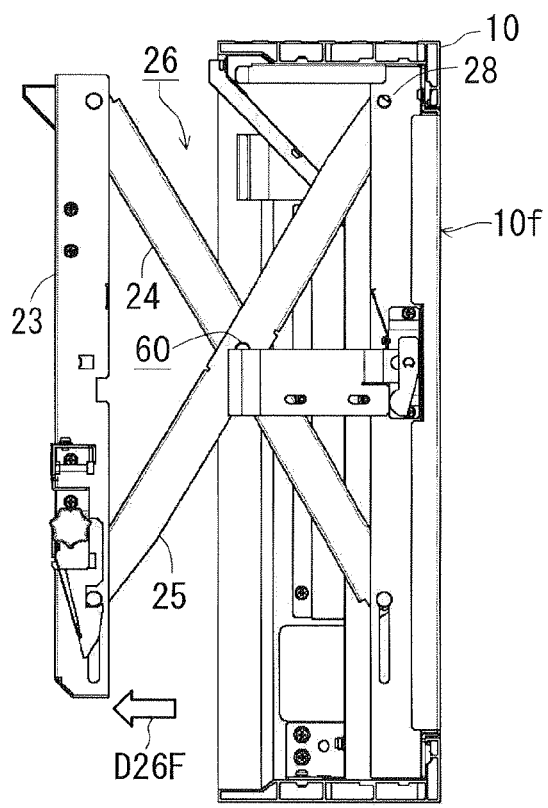
FIGS. 8A and 8B are cross-sectional views illustrating the cross-sectional structure of the pantograph structure.
Figure 8B:
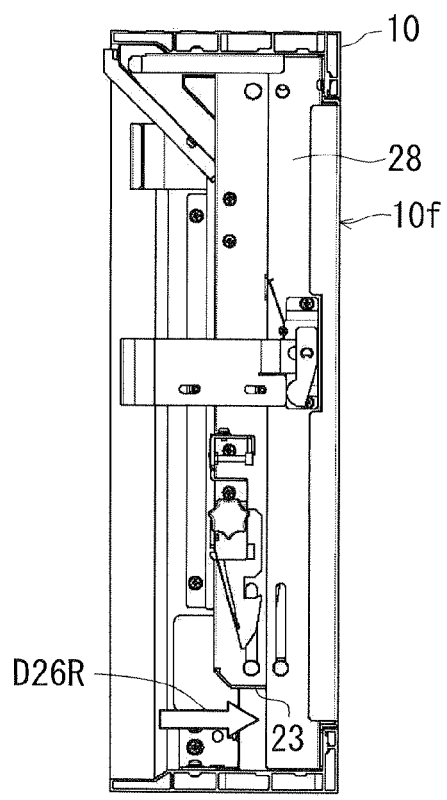

FIG. 6 is a perspective view illustrating the pantograph structures 26a and 26b moved rearward. FIG. 7 is a perspective view illustrating the pantograph structures 26a and 26b moved frontward. FIGS. 8A and 8B are cross-sectional views illustrating the cross-sectional structure of the pantograph structures 26 of the wall-mounted attaching apparatus 8. FIG. 8A shows the moved frontward state and FIG. 8B shows the moved rearward state.

As shown in these diagrams, each pantograph structure 26 (26a, 26b) has a supporting member 28 provided along the installation surface 10f of the mount portion 10, and crossbars 24 (24a, 24b) and 25 (25a, 25b) whose respective one ends are joined to the supporting member 28 and which are joined together in the center part with a rotary pin 60. The crossbar 24 is movably joined in a long hole formed along Y direction in a lower part of the supporting member 28. The crossbar 25 is rotatably joined in a hole provided in an upper part of the supporting member 28.

Then, the vertical front bar 23 (23a, 23b) is provided between the other ends of the crossbars 24 and 25, and the horizontal front bars 21 and 22 are provided across the vertical front bars 23a and 23b. The crossbar 24 is rotatably joined in a hole provided in an upper part of the vertical front bar 23. The crossbar 25 is movably joined in a long hole formed in Y direction in a lower part of the vertical front bar 23.

The vertical front bars 23 and the crossbars 24 function as a fitting portion to which the thin display apparatus 40 is actually fitted. The pantograph structures 26 function as a movable portion in which the crossbars 24 and 25 stretch/contract around the pin 60 to move the fitting portion in a pantograph moving direction D26. The structure including the fitting portion and the movable portion form the display apparatus attaching portion 5.

After the thin display apparatus 40 has been fitted, the fitting portion is moved in the pantograph moving direction D26 by moving the attached thin display apparatus 40 itself frontward and rearward. Before the thin display apparatus 40 is fitted, the fitting portion can be moved by moving the horizontal front bars 21 and 22 frontward and rearward, for example.

The pantograph moving direction D26 is a direction that is perpendicular to the installation surface 10f of the mount portion 10, and the pantograph moving direction D26 will hereinafter be referred to also as Z direction.

As shown in FIG. 8A, when the pantograph structure 26 moves to the limit in the pantograph frontward direction D26F, it is a released state in which the vertical front bar 23 is separated most distant from the installation surface 10f of the mount portion 10. When the thin display apparatus 40 is attached in this released state, it looks like the thin display apparatus 40e in FIG. 5.

On the other hand, as shown in FIG. 8B, when the pantograph structure 26 moves to the limit in the pantograph rearward direction D26R, it is an accommodated state in which the vertical front bar 23 is positioned closest to the installation surface 10f of the mount portion 10. When thin display apparatuses 40 are attached and the pantograph structures 26 are accommodated, they look like the thin display apparatuses 40a to 40d, 40f to 40i in FIG. 5.

In this way, when a thin display apparatus 40 is attached to the fitting portion of the wall-mounted attaching apparatus 8 of this preferred embodiment, the pantograph structures 26 as a movable portion move the fitting portion along the pantograph moving direction D26, whereby the thin display apparatus 40 can be relatively easily attached to and detached from the wall-mounted attaching apparatus 8.

Also, the pantograph structures 26 of this preferred embodiment are structured such that most part of the thin display apparatus 40 except the screen is placed inside the mount portion 10 in the accommodated state, and such that the entirety of the thin display apparatus 40 projects out of the mount portion 10 in the released state.

Accordingly, when thin displays are installed in a multiple arrangement manner in X direction and Y direction, a thin display apparatus 40 can be attached and detached alone to and from a wall-mount attaching apparatus 8 in any position, independently of the conditions of installation of thin display apparatuses 40 to the other wall-mounted attached apparatuses 8. As a result, any thin display apparatus, among a plurality of multi-arranged thin display apparatuses, can be smoothly attached and detached.

For example, in a 3×3 multiple display arrangement structure as shown in FIG. 5, even after all thin display apparatuses 40a to 40i have been installed, the central thin display apparatus 40e alone can be relatively easily detached and attached by releasing the pantograph structures 26 of the wall-mounted attaching apparatus 8e to which the thin display apparatus 40e is attached.

<Lock Mechanism (1)>

Figure 9:
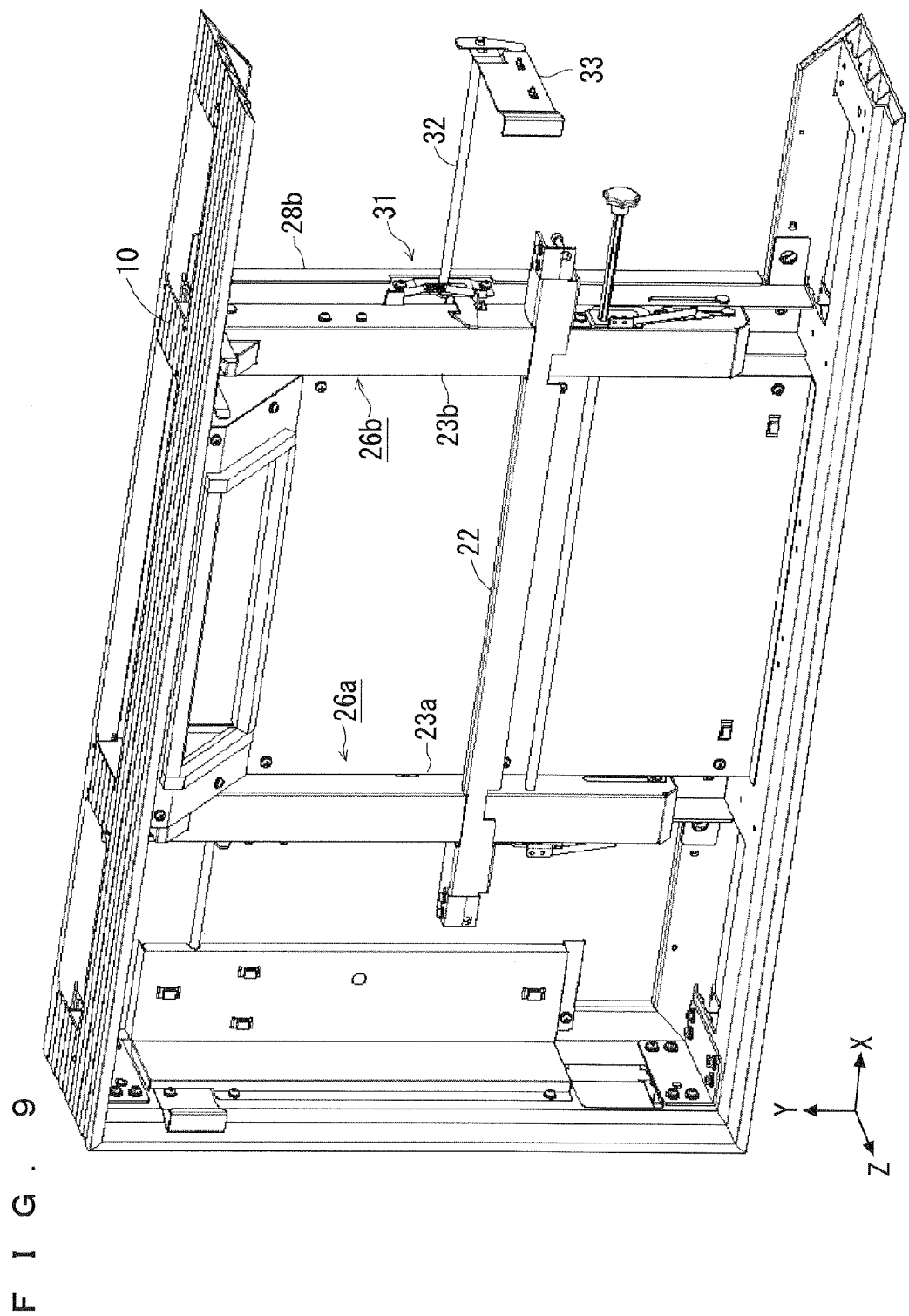
FIG. 9 is a perspective view illustrating a lock mechanism with the pantograph structured accommodated.

FIG. 9 is a perspective view illustrating a lock mechanism effected when the pantograph structures 26 are accommodated. As shown in FIG. 9, mainly, a lock member 31, a shaft 32, and a lock release jig 33 form a lock mechanism (a first lock mechanism) for locking the movement of the pantograph structures 26 in the pantograph frontward direction D26F when the pantograph structures 26 are accommodated. The lock member 31 engages with a projection 36 (shown in FIGS. 10A and 10B) formed in X direction on the vertical front bar 23. The shaft 32 connects the lock member 31 and the lock release jig 33 provided near an end of the mount portion 10 in X direction. When the lock release jig 33 moves in Z direction, the shaft 32 rotates, the lock member 31 moves down, and the engagement with the projection 36 is released. FIG. 9 only shows the lock mechanism of one pantograph structure 26b, but a similar lock mechanism is provided also for the other pantograph structure 26a. However, the positions of the lock mechanisms in Y direction are different between the pantograph structures 26a and 26b. This is in order to minimize the expansion in X direction caused by the provision of the first lock mechanisms. Hereinafter, the pantograph structures 26a and 26b are collectively described as a pantograph structure 26.

Figure 10A:
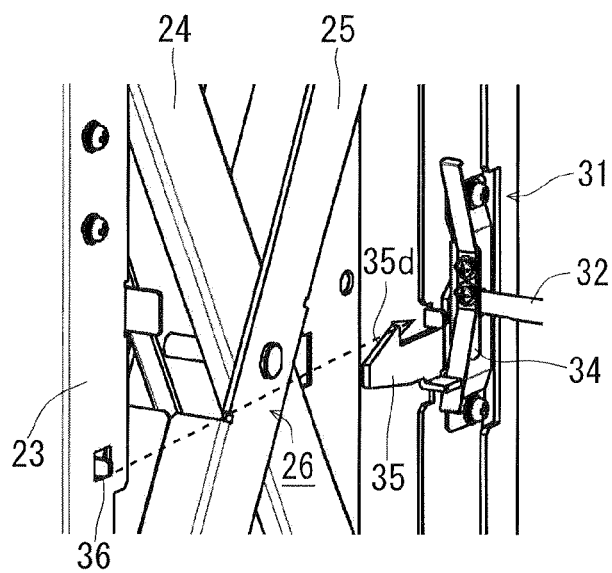
FIGS. 10A and 10B are illustrative diagrams showing the detailed structure of the lock member shown in FIG. 9.
Figure 10B:
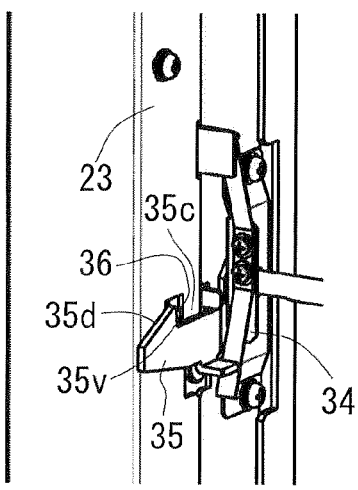

FIGS. 10A and 10B are illustrative diagrams showing the detailed structure of the lock member 31. FIG. 10A shows the pantograph structure 26 released, and FIG. 10B shows the pantograph structure 26 accommodated.

As shown in FIG. 10A, the vertical front bar 23 has the projection 36 projecting in X direction, and the position of the projection 36 in Y direction coincides with the position in Y direction of the inclined face 35d of the stopper SW35.

The stopper SW35 is provided on the shaft 32 such that it can rotate around the shaft 32. Also, a spring portion 34 applies an elastic force such that the stopper SW35 tries to rotate clockwise around the shaft 32, and so the stopper SW35 is stable in the manner shown in FIG. 10A.

From the released state shown in FIG. 10A, when the pantograph structure 26 is operated in the pantograph rearward direction D26R, the projection 36 of the vertical front bar 23 moves in the direction shown by dotted line. Then, the position of the projection 36 in Y direction coincides with the position of the inclined face 35d of the stopper SW35 in Y direction, so that the projection 36 abuts on the inclined face 35d, advances while pressing down the stopper SW35 counterclockwise around the shaft 32, and then it is accommodated in the recess 35c of the stopper SW35 as shown in FIG. 10B in the accommodated state.

Once the projection 36 has been accommodated in the recess 35c of the stopper SW35, the recess 35c (vertical portion 35v) of the stopper SW35 functions as a stopper for the projection 36, and so the movement of the vertical front bar 23 in the pantograph frontward direction D26F is certainly locked.

Figure 11:
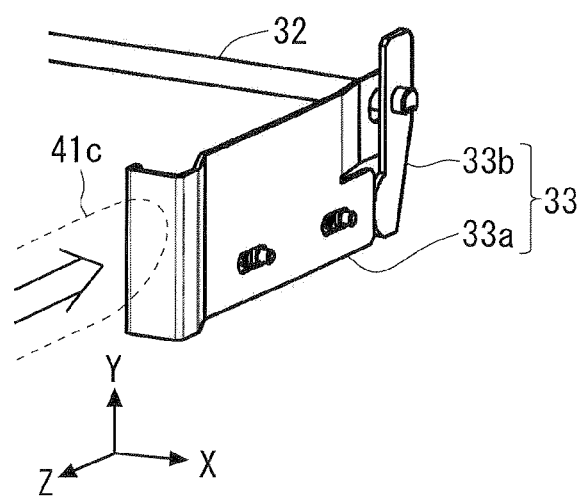
FIG. 11 is an illustrative diagram showing the details of the lock release jig shown in FIG. 9.

FIG. 11 is an illustrative diagram illustrating the details of the lock release jig 33. As shown in FIG. 11, the lock release jig 33 includes a push plate 33a and a stopper plate 33b. The stopper plate 33b is provided to move together with the shaft 32, and the shaft 32 rotates counterclockwise when the stopper plate 33b rotates counterclockwise.

Also, when the push plate 33a is pushed by a plate 41c provided on the side of the thin display apparatus 40, it then rotates the stopper plate 33b counterclockwise.

Figure 12A:
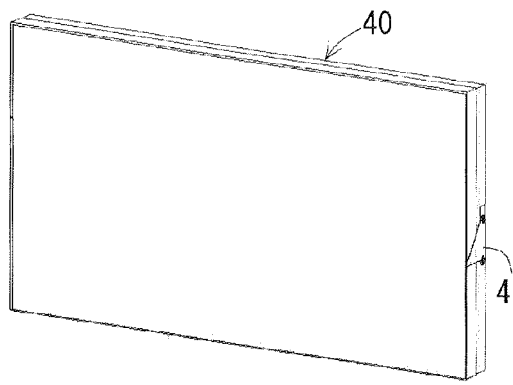
FIGS. 12A and 12B are perspective views illustrating the front and back structures of a thin display apparatus.
Figure 12B:
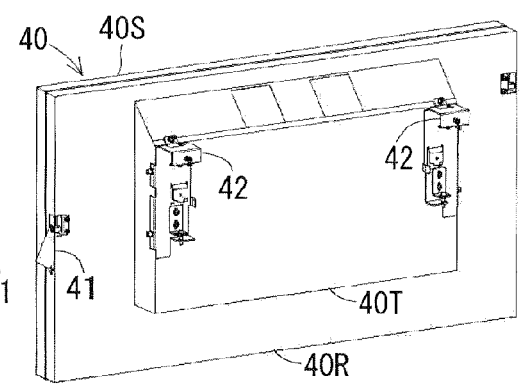

FIGS. 12A and 12B are perspective views illustrating the front and back structures of the thin display apparatus 40. FIG. 12A illustrates the front structure and FIG. 12B illustrates the back structure. As shown in FIGS. 12A and 12B, a handle unit 41 is provided on the right side seen from front (on the left side seen from back). The handle unit 41 is provided to move the lock release jig 33 in Z direction in order to release the first lock mechanism in the accommodated state. The holder units 42 provided on the back projection 40T of the display back portion 40R will be described later in detail. The holder units 42 are provided to attach the thin display apparatus to the crossbars 24.

Figure 13A:
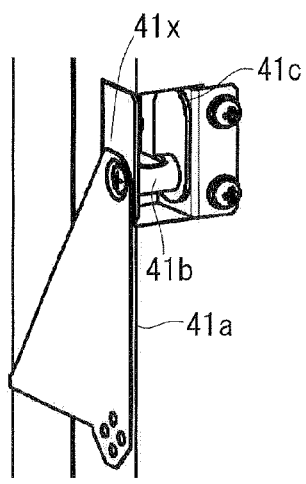
FIGS. 13A and 13B are perspective views illustrating the details of the handle unit shown in FIG. 12.
Figure 13B:
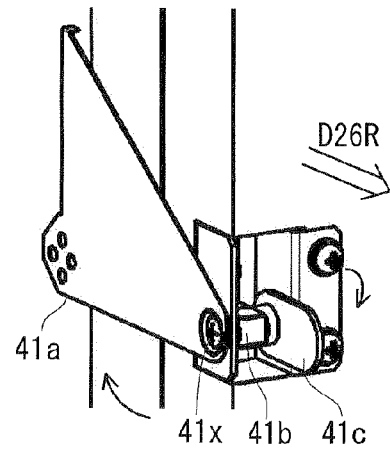
Figure 14A:
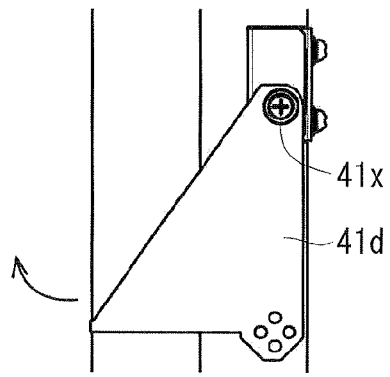
FIGS. 14A and 14B are side views illustrating the details of the handle unit shown in FIG. 12.
Figure 14B:
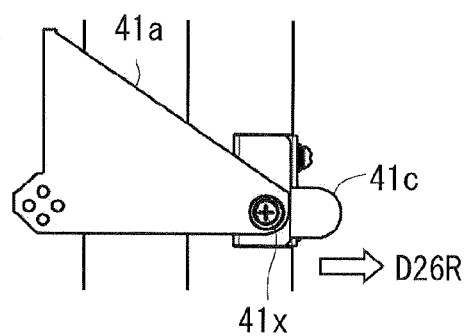

FIGS. 13A and 13B and FIGS. 14A and 14B are illustrative diagrams illustrating the details of the handle unit 41. FIGS. 13A and 13B are perspective views showing the structure seen from the side of the display back portion 40R, and FIGS. 14A and 14B are side views showing the structure seen from the right side of the display surface portion 40S of the thin display apparatus 40.

As shown in these diagrams, the handle rotation axis 41x of the handle 41a is joined to the pin 41b such that it can rotate around the pin 41b. Similarly, the plate 41c is rotatably joined to the pin 41h. The handle 41a and the plate 41c are placed such that their ends are positioned in opposite directions from the pin 41b.

Accordingly, in the state shown in FIG. 13A and FIG. 14A, when the handle 41a is rotated clockwise, the plate 41e also rotates clockwise, and as shown in. FIGS. 13B and 14B, the plate 41c projects in the pantograph rearward direction D26R.

Figure 15:
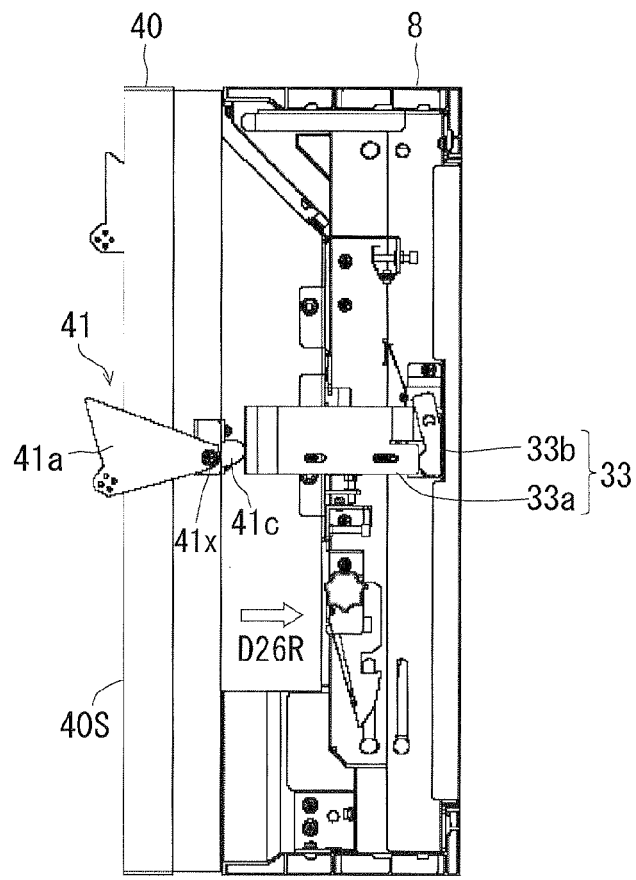
FIG. 15 is an illustrative diagram showing the details of the handle unit, the lock release jig, and their vicinities with the thin display apparatus attached to the wall-mounted attaching apparatus in an accommodated state.

FIG. 15 is an illustrating diagram showing the details of the handle unit 41, the lock release jig 33, and their vicinities, where the thin display apparatus 40 is attached to the wall-mounted attaching apparatus 8 in the accommodated state. FIG. 15 shows the structure seen from the right side of the display surface portion 40S of the thin display apparatus 40.

As shown in FIG. 15, when the handle 41a is rotated clockwise and the plate 41c is projected in the pantograph rearward direction D26R, the plate 41c pushes the push plate 33a in the pantograph rearward direction D26R, and rotates the stopper plate 33b counterclockwise.

Then, as the stopper plate 33b rotates, the shaft 32 rotates counterclockwise, and the stopper SW35 rotates counterclockwise as the shaft 32 rotates, and the vertical portion 35v moves down. As a result, the lock function of the stopper SW35 is released, since the lock function is achieved as the projection 36 is accommodated in the recess 35c of the stopper SW35, and then the pantograph structure 26 can be moved in the pantograph frontward direction D26F.

In this way, the wall-mounted attaching apparatus 8 of this preferred embodiment has the first lock mechanism (the lock member 31, shaft 32, lock release jig 33, etc.) for locking the movement of the pantograph structures 26 in Z direction (in the pantograph frontward direction D26F) when the pantograph structures 26 are accommodated. Accordingly, the thin display apparatus 40 can be installed stably when the pantograph structures 26 are accommodated.

<Lock Mechanism (2)>

Figure 16:
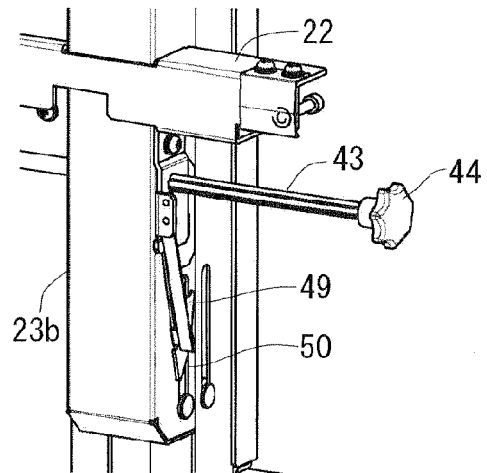
FIG. 16 is a perspective view illustrating a lock mechanism for the pantograph structure released.

FIG. 16 is a perspective view illustrating a lock mechanism effected when the pantograph structure 26 is released. As shown in FIG. 16, mainly, a shaft 43, knob 44, spring portion 49, and lock plate 50 form a lock mechanism (a second lock mechanism) for locking the movement in the pantograph rearward direction D26R when the pantograph structures 26 are released. FIG. 16 only shows one pantograph structure 26b (the vertical front bar 23b), but a similar lock mechanism is provided also for the pantograph structure 26a. However, the shaft 43 and the knob 44 are shared by the pantograph structures 26a and 26b.

Figure 17A:
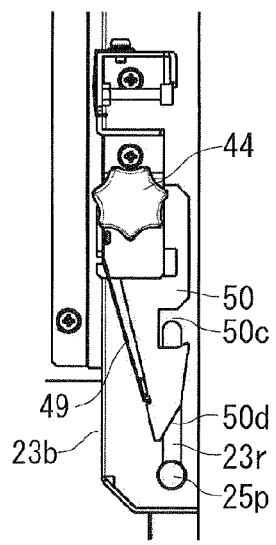
FIGS. 17A, 17B and 17C are illustrative diagrams showing the detailed structure of the lock mechanism shown in FIG. 16.
Figure 17B:
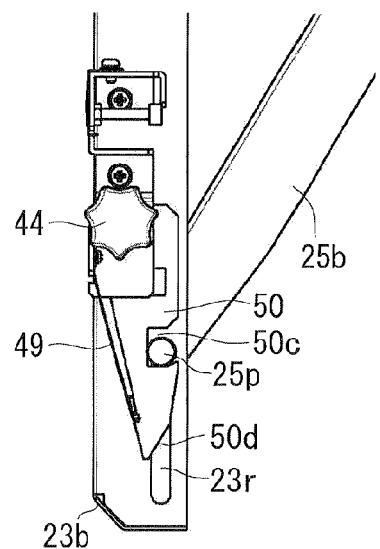
Figure 17C:
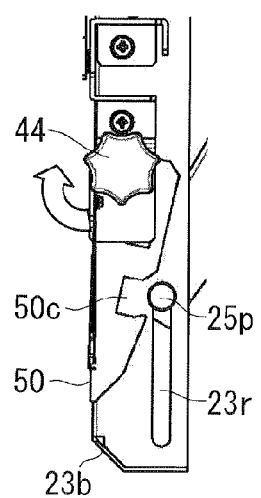

FIGS. 17A, 17B and 17C are illustrative diagrams illustrating the detailed structure of the second lock mechanism. FIG. 17A shows the accommodated state of the pantograph structure 26b, and FIGS. 17B and 17C show the released state of the pantograph structure 26b.

As shown in FIG. 17B, an up-down pin 25p provided at an end of the crossbar 25b is joined to the vertical front bar 23b such that it can move in Y direction in an up-down region 23r in the vertical front bar 23b.

Also, the lock plate 50 is always subjected to the elastic force by the spring portion 49 such that it tries to rotate counterclockwise, and it is normally stable in the state shown in FIG. 17A.

As shown in FIG. 17A, in the accommodated state where the crossbar 25b is parallel to Y direction, the up-down pin 25p is positioned at the bottom position in the up-down region 23r.

From this accommodated state, when the pantograph structure 26b is operated in the pantograph frontward direction D26F, the up-down pin 25p moves up in the up-down region 23r, and it abuts on the inclined face 50d of the lock plate 50, and moves up in the up-down region 23r while rotating the lock plate 50 clockwise. Then, in the released state, as shown in FIG. 17B, it is positioned at the top position in the up-down region 23r. Then, the lock plate 50 returns and becomes stable in the state shown in FIG. 17B due to the elastic three of the spring portion 49, and the up-down pin 25p is accommodated in the recess 50c of the lock plate 50.

Once the up-down pin 25p has been accommodated in the recess 50c of the lock plate 50, the recess 50c of the lock plate 50 functions as a stopper for the up-down pin 25p, and it certainly locks the movement of the vertical front bar 23b in the pantograph rearward direction D26R.

In this way, the position of the lock plate 50 becomes stable in the state shown in FIG. 17B due to the elastic force of the spring portion 49, which locks and prevents the moving down of the up-down pin 25p in the up-down region 23r, i.e. the movement of the pantograph structure 26b in the pantograph rearward direction D26R.

Since the pantograph structure 26a (not shown) moves together with the pantograph structure 26b, the movement of the pantograph structure 26a in the pantograph rearward direction D26R is also locked.

In the released and locked state as shown in FIG. 17B, when the knob 44 is rotated clockwise as shown in FIG. 17C, then the shaft 43 also rotates clockwise. Then, as the shaft 43 rotates, the lock plate 50 also rotates clockwise. As a result, the lock function by the spring portion 49 and the lock plate 50 is released, since it is achieved as the up-down pin 25p is accommodated in the recess 50c of the clock plate 50, and the pantograph structure 26b can be moved in the pantograph rearward direction D26R. In this case, because the shaft 43 and the knob 44 are used also by the pantograph structure 26a, the lock function of the pantograph structure 26a is also released as the lock function of the pantograph structure 26b is released.

In this way, the wall-mounted attaching apparatus 8 of this preferred embodiment has a second lock mechanism for locking the movement of the pantograph structures 26 in Z direction (in the pantograph rearward direction D26R) when the pantograph structures 26 are released, so that the thin display apparatus 40 can be accurately attached to and detached from the fitting portion (the horizontal front bar 22, vertical front bars 23) when the pantograph structures 26 are released.

<Link and Guide Mechanisms>

(Link Mechanism)

Figure 18:
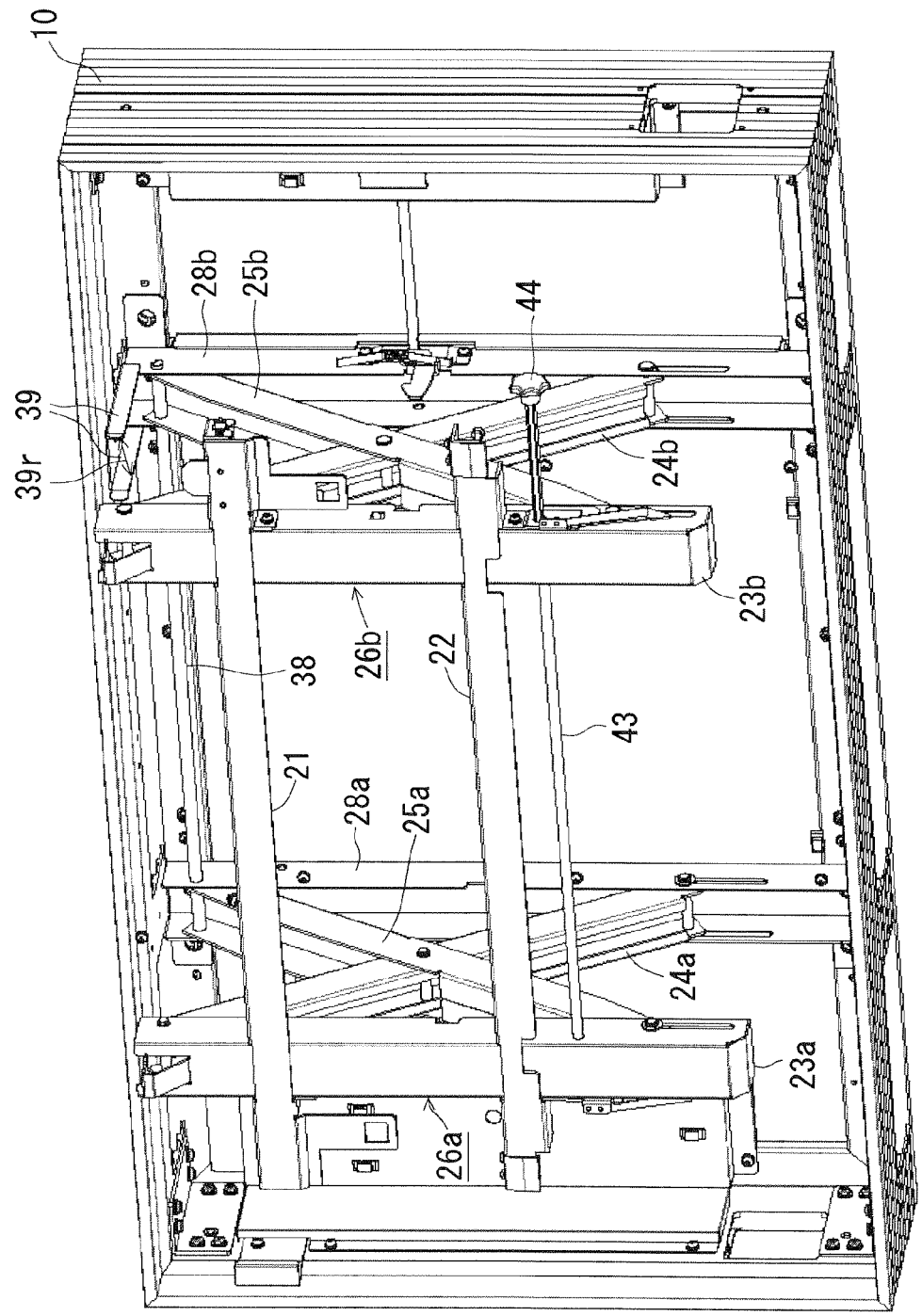
FIG. 18 is a perspective view illustrating a link mechanism of the two pantograph structures.

FIG. 18 is a perspective view illustrating a link mechanism of the pantograph structures 26a and 26b. As shown in FIG. 18, a rotatable link shaft 38 is provided in an upper part between the supporting members 28a and 28b. The link shaft 38 functions as a rotatable fastening member that is common between one end of the crossbar 25a of the pantograph structure 26a and one end of the crossbar 25b of the pantograph structure 26b. Both ends of the link shaft 38 are fixed respectively to the crossbars 25a and 25b and connect the pantograph structures 26a and 26b.

Accordingly, the pantograph structure 26a and the pantograph structure 26b smoothly move in the pantograph moving direction D26 while accurately moving together through the link shaft 38.

In this way, the wall-mounted attaching apparatus 8 of this preferred embodiment has the link shaft 38 connecting the pantograph structure 26a and the pantograph structure 26b such that the pantograph structures 26a and 26b operate together in the pantograph moving direction 26D, whereby the pantograph structures 26a and 26b can smoothly and accurately operate in the pantograph moving direction D26.

(Guide Mechanism)

Also, as shown in FIG. 18, a guide 39 is provided in the uppermost portion of the supporting member 28b, and the guide 39 extend in the pantograph rearward direction D26R and the X direction position of its guide path 39r is opposed to the vertical front bar 23b.

The guide 39 is provided such that the uppermost portion of the vertical front bar 23b passes within the guide path 39r when the vertical front bar 23b moves in the pantograph rearward direction D26R from the released state to the accommodated state.

In this way, according to the wall-mounted attaching apparatus 8 of this preferred embodiment, the existence of the guide 39 restricts shift in X direction of the pantograph structure 26b, whereby shift in X direction of the entire pantograph structures 26a and 26b is certainly suppressed.

<Attaching Members in Fitting Portion>

<Contents of Attachment>

Figure 19:
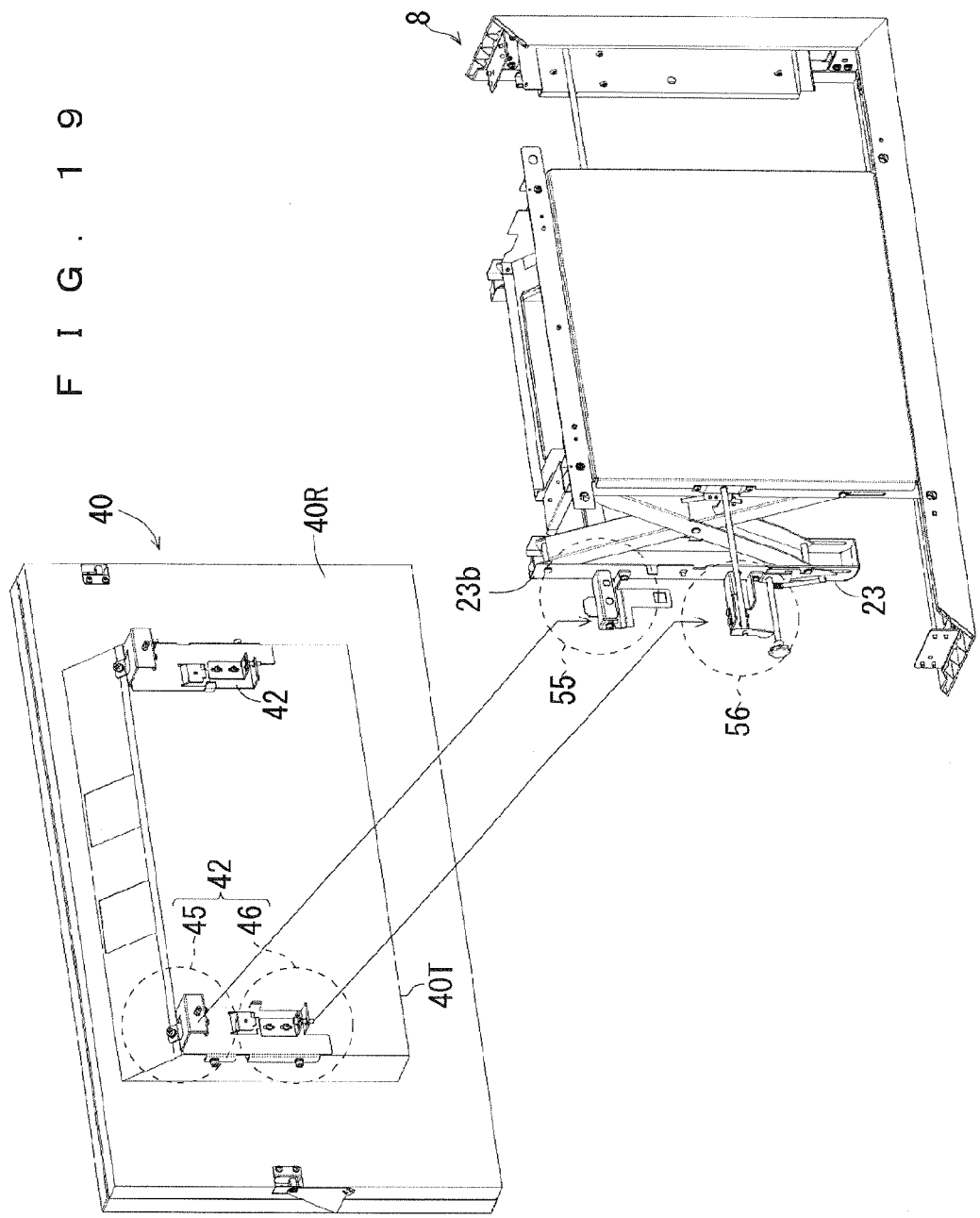
FIG. 19 is an illustrative diagram schematically showing the thin display apparatus before attached to the wall-mounted attaching apparatus.
Figure 20:
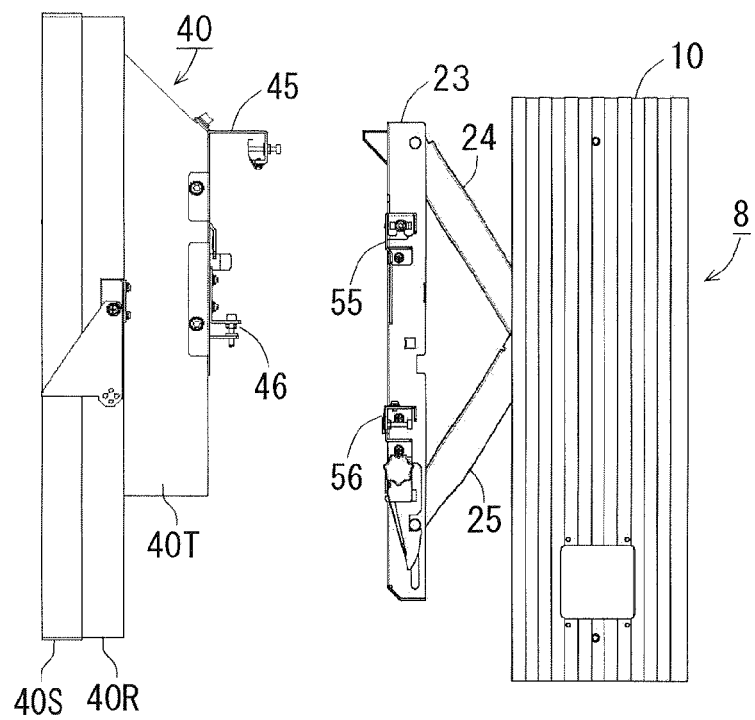
FIG. 20 is an illustrative diagram seen from side schematically showing the thin display apparatus before attached to the wall-mounted attaching apparatus.

FIG. 19 is an illustrative diagram schematically showing the thin display apparatus 40 before it is attached to the wall-mounted attaching apparatus 8. FIG. 20 is an illustrating diagram seen from side, schematically showing the thin display apparatus before it is attached to the wall-mounted attaching apparatus 8. As shown in these diagrams, holder units 42 are provided on both sides of the back projection 40T of the display back portion 40R. Each holder unit 42 includes an upper attaching member 45 and a lower placing portion 46 (lower attaching member).

Also, an upper attaching member 55 and a lower placing stand 56 (lower attaching member) are provided on the vertical front bar 23b and its vicinity. The upper attaching member 45 and the upper attaching member 55, and the lower placing portion 46 and the lower placing stand 56, respectively achieve given joint states, whereby the thin display apparatus 40 is attached to the wall-mounted attaching apparatus 8.

In the description below, for the sake of convenience, the pantograph structures 26 (the horizontal front bar 22, vertical front bars 23, crossbars 24, 25), the holder units 42, etc. are collectively described. In practice, same attachment is achieved between the pantograph structures 26a and 26b of the wall-mounted attaching apparatus 8 and the corresponding holder units 42 and 43 (attachment between the upper attaching member 45 and the upper attaching member 55 and between the lower placing portion 46 and the lower placing stand 56).

Figure 21:
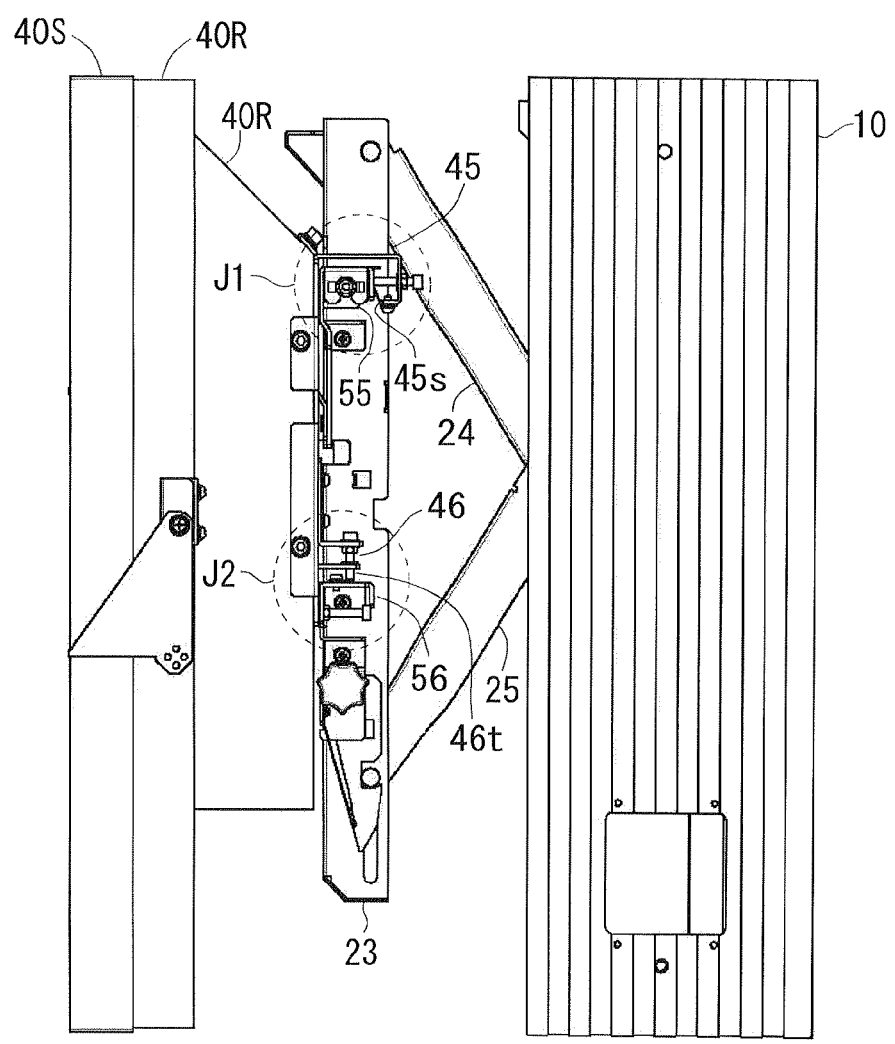
FIG. 21 is an illustrative diagram seen from side schematically showing the thin display apparatus after attached to the wall-mounted attaching apparatus.

FIG. 21 is an illustrative diagram seen from side, showing the thin display apparatus 40 attached to the wall-mounted attaching apparatus 8.

As shown in FIG. 21, the upper attaching member 45 is fitted over the upper attaching member 55, and the left side of the upper attaching member 45 is hung on the right side of the upper attaching member 55, whereby the upper attaching member 45 is attached to the upper attaching member 55 to realize a first joint state J1. In this process, the left side of the upper attaching member 45 is formed of a spring plate 45s having elasticity, so that the left side of the upper attaching member 45 can be relatively smoothly hung on the right side of the upper attaching member 55.

Also, the lower placing portion 46 is attached to the lower placing stand 56 to realize a second joint state J2 by causing the tip of a Y-direction adjusting screw 46t of the lower placing portion 46 to abut on the lower placing stand 56. In this way, the thin display apparatus 40 is attached to the display apparatus attaching portion 5 of the wall-mounted attaching apparatus 8 through the attachment between the upper attaching member 45 and the upper attachment member 55 and the attachment between the lower placing portion 46 and the lower placing stand 56.

As described above, the display apparatus attaching portion 5 of the wall-mounted attaching apparatus 8 has the upper attaching member 55. Accordingly, the upper attaching member 45 of the holder unit 42 provided on the back projection 40T of the thin display apparatus 40 can be attached to the upper attaching member 55 by hanging, and this is the main part of the attaching work. Thus, the thin display apparatus 40 can be attached to the display apparatus attaching portion 5 relatively easily.

(X Direction Adjustment)

Figure 22A:
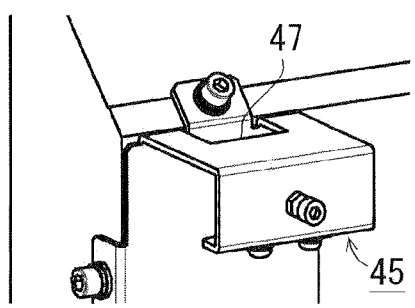
FIGS. 22A and 22B are illustrative diagrams showing the details of upper attaching members of the thin display apparatus and the wall-mounted attaching apparatus.
Figure 22B:
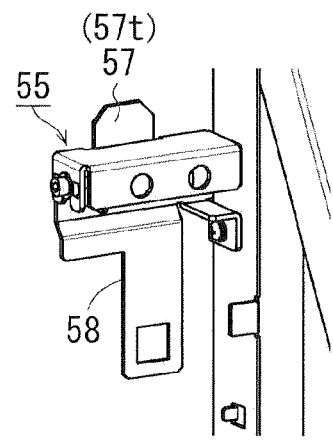

FIGS. 22A and 22B are illustrative diagrams showing the details of the upper attaching member 45 and the upper attaching member 55. FIG. 22A shows the details of the upper attaching member 45 and FIG. 22B shows the details of the upper attaching member 55.

As shown in FIG. 22A, the upper attaching member 45 has an upper opening region 47 in the upper surface. On the other hand, as shown in FIG. 22B, the upper attaching member 55 includes a fixed portion 58 fixed to the vertical front bar 23 or the horizontal front bar 22 (not shown) and an X-direction movable portion 57 that can be moved in X direction.

The X-direction movable portion 57 has a projection 57t projecting in Y direction, and the upper attaching member 45 and the upper attaching member 55 can be attached together by hanging the upper attaching member 45 on the upper attaching member 55, with the projection 57t projecting in the upper opening region 47. That is to say, the position of the projection 57t is the attaching position (given position) of the upper attaching member 55.

Accordingly, by moving the projection 57t of the upper attaching member 55 in X direction, the attaching position of the upper attaching member 45 can be varied in X direction.

Figure 23A:
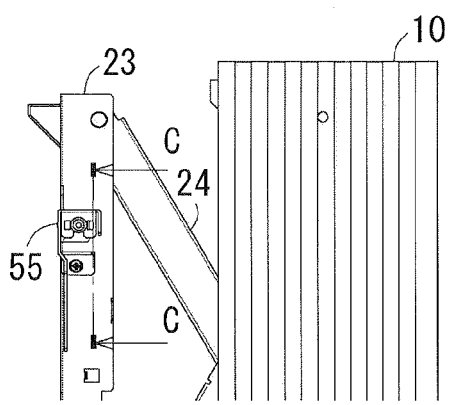
FIGS. 23A and 23B are illustrative diagrams showing the details of the upper attaching member of the wall-mounted attaching apparatus.
Figure 23B:
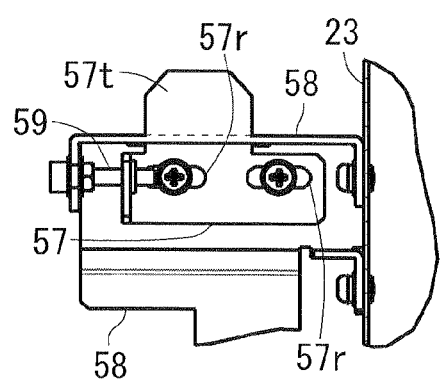

FIGS. 23A and 23B are illustrative diagrams showing the details of the upper attaching member 55. FIG. 23A is an illustrative diagram seen from the side of the vertical front bar 23, and FIG. 23B is a cross-sectional view of its C-C section.

As shown in FIGS. 23A and 23B, the fixed portion 58 is fixed to the vertical front bar 23 by screwing. On the other hand, the X-direction movable portion 57 can move in X direction together with the movement in X direction of the X-direction adjusting screw 59 provided in the fixed portion 58. That is to say, the X-direction movable portion 57 is screwed such that it can move in X direction in two moving regions 57r, and its position in X direction can be adjusted according to the degree of tightening of the X-direction adjusting screw 59.

In this way, the upper attaching member 55 of this preferred embodiment includes the X-direction adjusting screw 59 and the X-direction movable portion 57, and it has an X-direction adjusting mechanism by which the position of the projection 57t defining the attaching position of the upper attaching member 45 can be variably set in X direction, so that the thin display apparatus 40 can be accurately positioned in X direction with respect to the wall-mounted attaching apparatus 8.

For the two upper attaching members 55 respectively provided for the pantograph structures 26a and 26b, providing one X-direction adjusting mechanism including the X-direction movable portion 57 and the X-direction adjusting screw 59 suffices. The position in X direction can be adjusted in one position.

(Y Direction Adjustment)

Figure 24A:
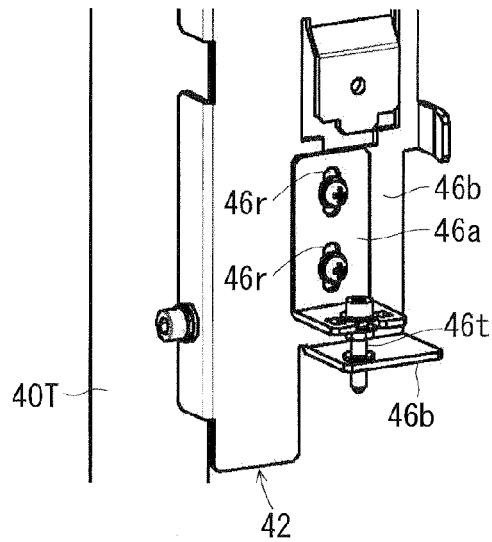
FIGS. 24A and 24B are illustrative diagrams showing the details of a lower placing portion and a lower placing stand of the thin display apparatus and the wall-mounted attaching apparatus.
Figure 24B:
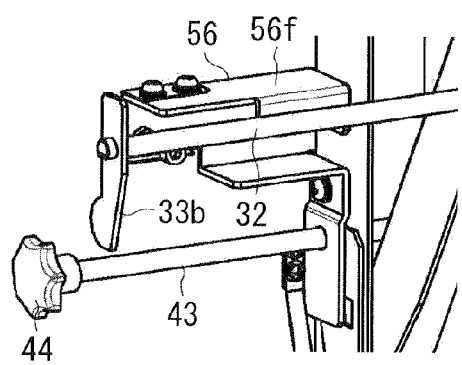

FIGS. 24A and 24B are illustrative diagrams showing the details of the lower placing portion 46 and the lower placing stand 56. FIG. 24A shows the details of the lower placing portion 46 and FIG. 24B shows the details of the lower placing stand 56.

As shown in FIG. 24A, the lower placing portion 46 has a movable portion 46a, a fixed portion 46b, and a Y-direction adjusting screw 46t.

The movable portion 46a can be moved in Y direction as the Y-direction adjusting screw 46t is moved in Y direction. That is to say, the movable portion 46a is screwed such that it can move in Y direction in two movable regions 46r, and its position in Y direction can be adjusted according to the degree of tightening of the Y-direction adjusting screw 46t into the fixed portion 46b.

Also, as shown in FIG. 24B, the lower placing stand 56 has a flat surface 56f on its top, and the lower placing portion 46 and the lower placing stand 56 are attached together by placing the tip of the Y-direction adjusting screw 46t on the flat surface 56f.

Accordingly, by adjusting the position of the Y-direction adjusting screw 46t in Y direction, the position of the thin display apparatus 40 in Y direction can be adjusted with respect to the wall-mounted attaching apparatus 8. The tip of the Y-direction adjusting screw 46t is rounded like the tip of a ballpoint pen, whereby the friction applied to the flat surface 56f is reduced.

The positioning in Y direction is performed in common between the two sets of lower placing portions 46 and the lower placing stands 56 provided corresponding to the pantograph structures 26a and 26b.

In this way, the wall-mounted attaching apparatus 8 of this preferred embodiment includes: the lower placing portion 46 including the Y-direction adjusting screw 46t and the movable portion 46a and having a Y-direction adjusting mechanism by which the thin display apparatus 40 attached to the fitting portion can be variably set in Y direction; and the lower placing stand 56 on which the lower placing portion 46 can be placed, so that the thin display apparatus 40 can be accurately positioned in Y direction with respect to the wall-mounted attaching apparatus 8.

The adjustment in Y direction is achieved at two points on the two lower placing stands 56, whereby the thin display apparatus 40 can be accurately positioned in Y direction. In addition, the two points can be independently adjusted, so that adjustment in a direction rotating around Z axis is also possible.

(Z Direction Adjustment)

Figure 25A:
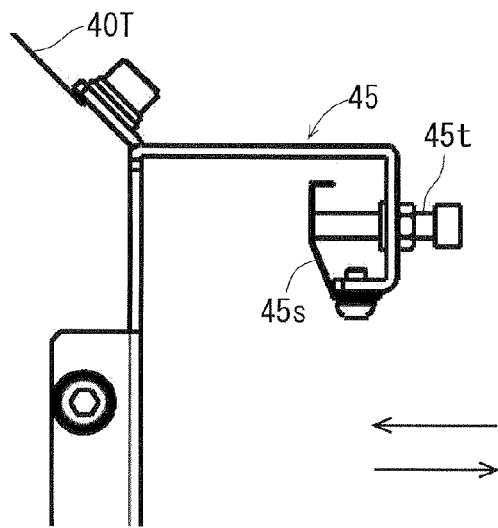
FIGS. 25A and 25B are illustrative diagrams showing the attachment between the upper attaching members of the thin display apparatus and the wall-mounted attaching apparatus.
Figure 25B:
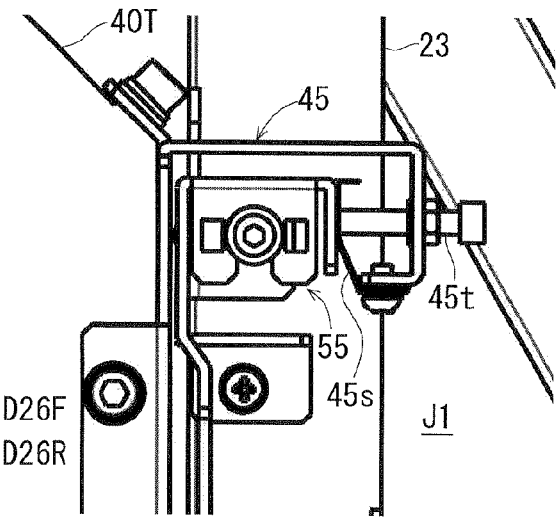

FIGS. 25A and 25B are illustrative diagrams showing the upper attaching member 45 attached to the upper attaching member 55. As shown in FIG. 25A, the upper attaching member 45 has the spring plate 45s and Z-direction adjusting screw 45t. Then, as shown in FIG. 25B, the upper attaching member 45 is hung over the upper attaching member 55 such that the spring plate 45s on the left side of the upper attaching member 45 abuts on the right side of the upper attaching member 55, whereby the first joint state J1 between the upper attaching member 45 and the upper attaching member 55 is realized.

In the first joint state J1 shown in FIG. 25B, the position in Z direction can be adjusted according to the degree of tightening of the Z-direction adjusting screw 45t.

When the Z-direction adjusting screw 45t is rotated in the tightening direction, the Z-direction adjusting screw 45t cannot move to the left in the diagram, since the upper attaching member 55 is fixed. Accordingly, naturally, the upper attaching member 45 moves in the pantograph rearward direction D26R. On the other hand, when the Z-direction adjusting screw 45t is rotated in the loosening direction, the upper attaching member 45 moves in the pantograph frontward direction D26F.

As a result, the thin display apparatus 40 can be adjusted in Z direction with the Z-direction adjusting screw 45t.

FIGS. 26A and 26B are illustrative diagrams showing the lower placing portion 46 supported on the lower placing stand 56. In FIG. 26A, the tip of the Y-direction adjusting screw 46t of the lower placing portion 46 (the Y-direction adjusting screw 46t, movable portion 46a, and fixed portion 46b) is supported on the flat surface 56f of the lower placing stand 56, whereby the second joint state J2 is realized. FIG. 26B shows the details of the lower placing stand 56 in an enlarged manner.

As shown in FIGS. 26A and 26B, when the lower placing stand 56 is in the second joint state J2 with the lower placing portion 46, the spring plate 56s screwed in the flat surface 56f abuts on the surface of the back projection 40T. The degree of abutting of the spring plate 56s can be adjusted according to the degree of tightening of the Z-direction adjusting screw 56t.

That is to say, as shown in FIG. 26A, in this second joint state J2, when the Z-direction adjusting screw 56t is rotated in the tightening direction, the pressing force by the Z-direction adjusting screw 56t to the back projection 40T through the spring plate 56s is strengthened, and it moves the thin display apparatus 40 in the pantograph frontward direction D26F. On the other hand, when the Z-direction adjusting screw 56t is rotated in the loosening direction, the pressing force by the Z-direction adjusting screw 56t to the back projection 40 through the spring plate 56s is weakened, and it moves the thin display apparatus 40 in the pantograph rearward direction D26R. As a result, the Z-direction adjusting screw 56t can achieve adjustment in Z direction.

The positioning in Z direction is achieved with the two sets of upper attaching members 45 and the upper attaching members 55 and the two sets of lower placing portions 46 and the lower placing stands 56 provided corresponding to the pantograph structures 26a and 26b.

In this way, in this preferred embodiment, the upper attaching member 45 having the Z-direction adjusting screw 45t and the spring plate 45s, and the lower placing stand 56 having the spring plate 56s and the Z-direction adjusting screw 56t, have Z-direction adjusting mechanisms by which the thin display apparatus 40 attached to the fitting portion can be variably set in Z direction, whereby the thin display apparatus 40 can be accurately positioned in Z direction with respect to the waft-mounted attaching apparatus 8.

The thin display apparatus 40 can be accurately positioned in Z direction by achieving the adjustment in Z direction at arbitrary three points among the four points of the two lower placing stands 56 and the two upper attaching members 45.

(Electric Mechanism)

The adjustment of tightening of the X-direction adjusting screw 59, Y-direction adjusting screws 46t, Z-direction adjusting screws 45t and Z-direction adjusting screws 56t, for X-direction, Y-direction, and Z-direction adjustment, is usually achieved by manually tightening and loosening the screws. In this process, the adjustment of tightening of the adjusting screws may be achieved by electric driving using an electrically driven part, such as a jig equipped with a motor.

In this case, with such an electrically driven part, the operation of adjustment in X direction, Y direction and Z direction can be quickly achieved from outside. Such an electrically driven part may be provided for at least one of the X-direction adjusting screw 59, Y-direction adjusting screws 46t, Z-direction adjusting screws 45t, and Z-direction adjusting screws 56t, and the adjustment of that screw can be quickly achieved from outside.

While the invention has been described in detail, the foregoing description is in all aspects illustrative and not restrictive. It is understood that numerous other modifications and variations can be devised without departing from the scope of the invention.

What is claimed is:

1. A wall-mounted attaching apparatus for attaching a given display apparatus on a wall surface, said wall-mounted attaching apparatus comprising:
   at least two mounting brackets;
   a frame body, which surrounds at least a rear portion of the given display apparatus, including,
   an installation surface facing and being fixed to the wall surface, the installation surface having an upper rectangular section, a lower rectangular section, and a hung opening formed between the upper and lower rectangular sections such that the installation surface can temporarily be hung by engaging an upper edge of the hung opening with the at least two mounting brackets provided on the wall surface,
   a plurality of upper fixing screw holes being formed in the upper rectangular section to fix said frame body by screwing on the wall surface,
   a plurality of lower fixing screw holes being formed in the lower rectangular section to fix said frame body by screwing on the wall surface,
   a plurality of positioning holes being formed adjacent to said upper fixing screw holes, wherein
   each of said fixing screw holes are sized larger than said positioning holes so that said upper and lower fixing screw holes have a given screwing position freedom.

2. The wall-mounted attaching apparatus according to claim 1, further comprising:
   a display apparatus attaching portion which is provided in said frame body and to which said given display apparatus is attached; and
   an exhaust portion that exhausts air that cooled said given display apparatus attached to said display apparatus attaching portion.

3. The wall-mounted attaching apparatus according to claim 2, wherein said frame body has a rectangular outside shape defined by a first direction and a second direction,
   said exhaust portion has an exhaust passage extending in said second direction, and
   said exhaust passage is provided such that, when a plurality of said wall-mounted attaching apparatuses are arranged along said second direction, said exhaust passages are continuously connected between the plurality of wall-mounted attaching apparatuses thus arranged.

4. The wall-mounted attaching apparatus according to claim 3, wherein
   said frame body has a plurality of intake holes for taking in air from outside, and
   said plurality of intake holes are positioned such that, when a plurality of said wall-mounted attaching apparatuses are arranged along said first direction and second direction, at least one set of said plurality of intake holes face each other in said first direction and second direction between said plurality of wall-mounted attaching apparatuses thus arranged.

5. The wall-mounted attaching apparatus according to claim 3, said display apparatus attaching portion comprising
   a fitting portion to which said given display apparatus is fitted; and
   a movable portion that moves said fitting portion in a third direction perpendicular to said installation surface of said frame body while said given display apparatus is fitted on said fitting portion.

6. The wall-mounted attaching apparatus according to claim 5, wherein said movable portion comprises a first lock mechanism that locks movement of said movable portion in said third direction, in an accommodated state in which said fitting portion is close to said frame body.

7. The wall-mounted attaching apparatus according to claim 5, wherein said movable portion further comprises a second lock mechanism that locks movement of said movable portion in said third direction, in a released state in which said fitting portion is separated away from said frame body.

8. The wall-mounted attaching apparatus according to claim 5, said movable portion comprising
- a plurality of pantograph mechanisms that move said fitting portion in said third direction; and
- a link mechanism that couples between said plurality of pantograph mechanisms such that said plurality of pantograph mechanisms operate together in said third direction.

9. The wall-mounted attaching apparatus according to claim 8, wherein said movable portion further comprises a guide mechanism provided for at least one of said plurality of pantograph mechanisms in order to restrict shift in said first or second direction.

10. The wall-mounted attaching apparatus according to claim 5, wherein said fitting portion comprises an attaching member which is provided in a given position in said fitting portion and on which a given attaching member provided on a back of said given display apparatus is hung.

11. The wall-mounted attaching apparatus according to claim 10, wherein said attaching member comprises a first adjusting mechanism that variably sets said given position in said first direction.

12. The wall-mounted attaching apparatus according to claim 10, wherein said attaching member comprises a second adjusting mechanism that makes variable setting in said second direction for said given display apparatus fitted on said fitting portion.

13. The wall-mounted attaching apparatus according to claim 10, wherein said attaching member comprises a third adjusting mechanism that makes variable setting in said third direction for said given display apparatus fitted on said fitting portion.

\* \* \* \* \*